(12) United States Patent
van der Veen et al.

(10) Patent No.: US 12,574,295 B2
(45) Date of Patent: Mar. 10, 2026

(54) SYSTEM AND METHOD FOR DEPLOYING A COMMUNICATION NETWORK

(71) Applicant: Glass Routes LLC, Newark, DE (US)

(72) Inventors: Stuart Allan van der Veen, Santa Monica, CA (US); Matthew Ralph Adendorff, Charlotte, NC (US); Gregory Michael Wilson, Charlotte, NC (US)

(73) Assignee: Glass Routes LLC, Newark, DE (US)

( * ) Notice: Subject to any disclaimer, the term of this patent is extended or adjusted under 35 U.S.C. 154(b) by 104 days.

(21) Appl. No.: 18/737,934

(22) Filed: Jun. 7, 2024

(65) Prior Publication Data

US 2025/0310208 A1 Oct. 2, 2025

Related U.S. Application Data

(63) Continuation-in-part of application No. 18/625,128, filed on Apr. 2, 2024.

(51) Int. Cl.
H04L 41/14 (2022.01)
(52) U.S. Cl.
CPC .................................... H04L 41/14 (2013.01)
(58) Field of Classification Search
None
See application file for complete search history.

(56) References Cited

U.S. PATENT DOCUMENTS

| | | | | |
|---|---|---|---|---|
| 11,380,441 B1 * | 7/2022 | Baker | .................... | G06F 16/29 |
| 2016/0140143 A1 * | 5/2016 | Anklam | .................. | G06F 16/29 |
| | | | | 707/756 |
| 2017/0178376 A1 * | 6/2017 | Hong | ...................... | G06F 16/29 |
| 2020/0334278 A1 * | 10/2020 | Ascough | ................ | G06F 16/29 |
| 2021/0004638 A1 * | 1/2021 | Meng | ................... | G06F 16/906 |
| 2021/0076112 A1 * | 3/2021 | Hand | ................. | H04L 27/2096 |
| 2022/0293280 A1 * | 9/2022 | Baker | ................... | G16H 50/30 |
| 2024/0314575 A1 * | 9/2024 | Pabani | ................. | H04W 16/18 |

* cited by examiner

*Primary Examiner* — Mohamed Ibrahim

(74) *Attorney, Agent, or Firm* — Morgan, Lewis & Bockius LLP

(57) ABSTRACT

The system and method are provided for deployment of communication networks. The method includes obtaining geospatial data corresponding to blocks within a geographical area. The method also includes selecting as the respective cohort a block of a plurality of blocks. The method also includes adding a buffer zone of a predetermined size around a cohort. The method also includes appending to the cohort blocks that touch the cohort or intersect with the buffer zone. The method also includes repeating the adding and appending until there are no further blocks to add to the cohort. The method also includes ranking the cohorts based on the total number of premises within each cohort, and selecting where to deploy one or more communication networks based on the ranking.

25 Claims, 28 Drawing Sheets

Geospatial 110

Demographic 112

Telecom/Regulator 114

Imagery 116

Infrastructure 118

Business 120

Web 122

Scraped 124

Government 126

• • •

Data Sources  108

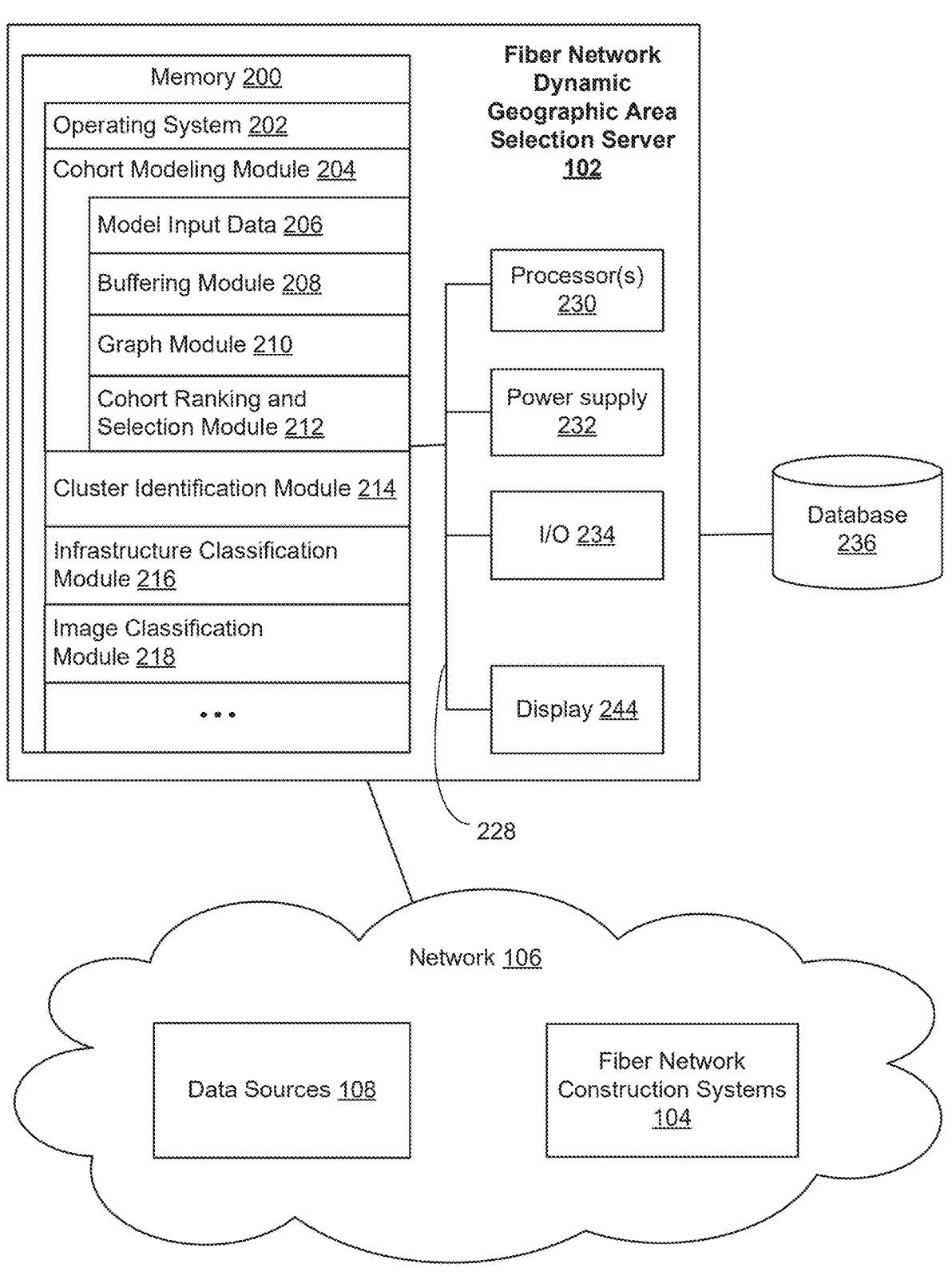

Fiber Network Dynamic Geographic Area Selection Server 102

Memory 200

Operating System 202

Cohort Modeling Module 204

Model Input Data 206

Buffering Module 208

Graph Module 210

Cohort Ranking and Selection Module 212

Cluster Identification Module 214

Infrastructure Classification Module 216

Image Classification Module 218

• • •

Processor(s) 230

Power supply 232

I/O 234

Display 244

Database 236

228

Network 106

Data Sources 108

Fiber Network Construction Systems 104

800 Dixon St

All    Street View & 360°

801 Dixon St
Kinston, North Carolina
Google Street View
May 2012    See more dates Jackson Ln
Dixon St
Garage A
Geo Saved Recents Kinston

324

352

Jackson Lane

Dixon Street

George Avenue

Williams Street

Lawence Lane Lawence

Lawarence Hights Williams Street

George Ave

Avenue Charlotte Avenue

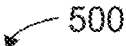

Obtain geospatial data corresponding to a plurality of blocks within a
geographical area 502

For each cohort of a plurality of cohorts 504:

Select as the respective cohort a block of the plurality of blocks 506

Add a buffer zone of a predetermined size around the respective
cohort 508

Append, to the respective cohort, blocks of the plurality of blocks
that touch the respective cohort or intersect with the buffer zone
510

Repeat the adding and appending until there are no further blocks
to add to the respective cohort 512

Rank the plurality of cohorts based on the total number of premises
within each respective cohort 514

Select where to deploy one or more communication networks based on
the ranking 516

Figure 5

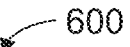

600

Obtain geospatial data corresponding to a plurality of blocks within a geographical area 602

Add a buffer zone of a predetermined size around blocks of the plurality of blocks 604

Generate an undirected network graph by iterating through the plurality of blocks, starting with a candidate node representing a block, and adding (i) a new node representing each block whose buffer zone intersects with or touches the block, and (ii) an edge connecting the candidate node and the new node 606

Select an initial set of cohorts of blocks from the plurality of blocks 608

Rank each cohort in the initial set of cohorts based on a total number of premises in blocks within the respective cohort 610

Select where to deploy one or more communication networks based on the ranking 612

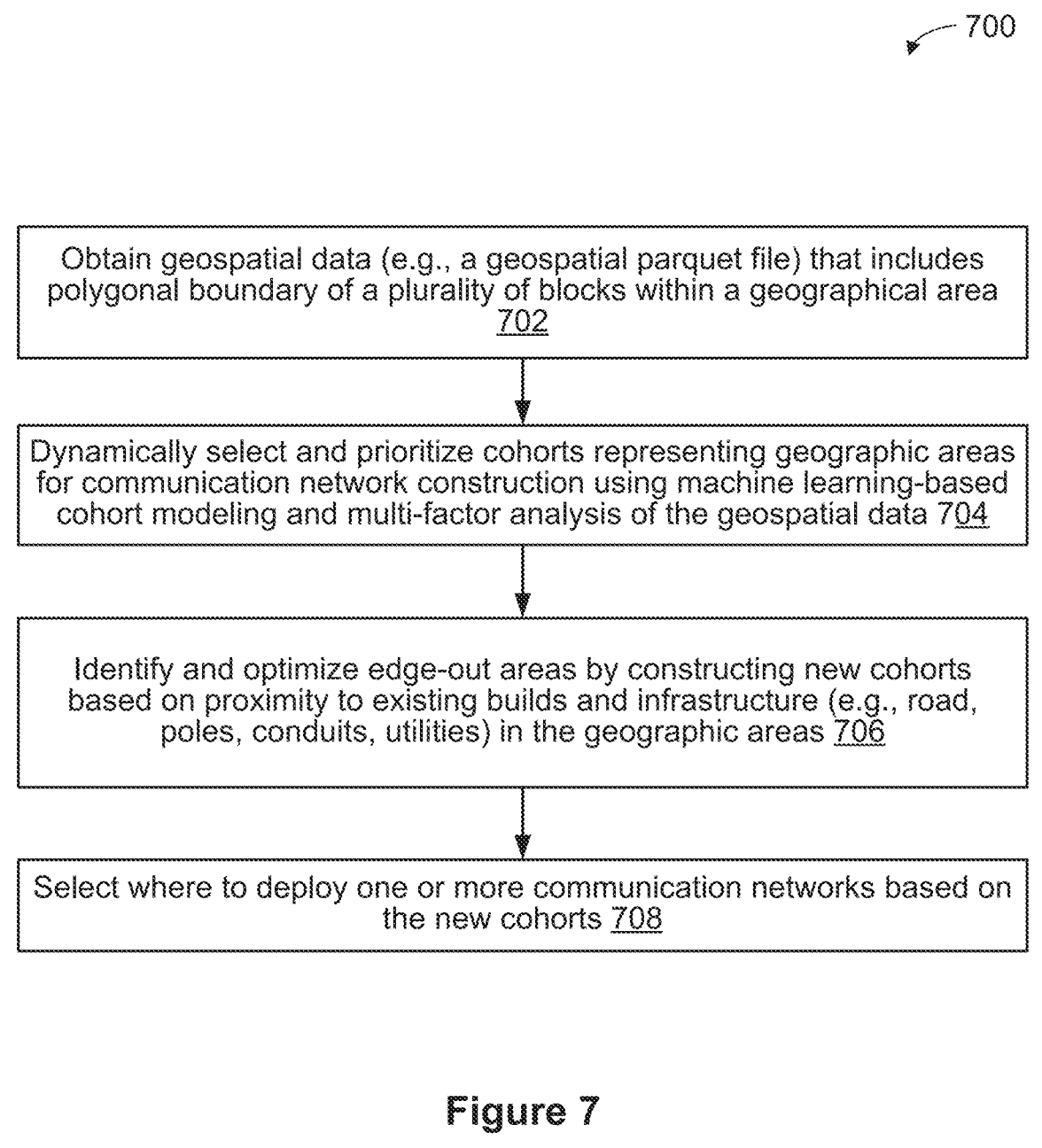

Obtain geospatial data (e.g., a geospatial parquet file) that includes polygonal boundary of a plurality of blocks within a geographical area 702

Dynamically select and prioritize cohorts representing geographic areas for communication network construction using machine learning-based cohort modeling and multi-factor analysis of the geospatial data 704

Identify and optimize edge-out areas by constructing new cohorts based on proximity to existing builds and infrastructure (e.g., road, poles, conduits, utilities) in the geographic areas 706

Select where to deploy one or more communication networks based on the new cohorts 708

Figure 7

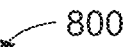

800

Ingest and integrate geospatial data from a plurality of structured and unstructured data sources 802

Identify an initial geographic area and construct a connected cohort using buffering and graph algorithms 804

Analyze infrastructure, competitive presence, demographics, and other attributes of the cohort to obtain one or more cohorts 806

Score and rank the one or more cohorts based on one or more objective functions 808

Merge cohorts based on proximity and density thresholds 810

Select top ranking cohort regions for communication network construction and planning 812

Figure 8

900
(Enlarged View)

1200

| Feature | Value |
|---|---|
| ▼ NC_census_blocks_analysis_v52 copy | |
| ▼ (ilec_brand_fcc | |
| ▲ (Derived) | |
| ▲ (Actions) | |
| ilec_brand_fcc | |
| ilec_fcc | 370499613012005 |
| GEOID20 | 17 |
| total_homes_census | 17 |
| occupied_homes_census | 0 |
| vacant_homes_census | 370499613012 |
| block_group_census | 134600 |
| median_home_value_acs | 9997 |
| error_home_value_acs | 56604 |
| median_hh_income_acs | 10625 |
| error_hh_income_acs | 47.1 |
| percentage_hhs_with_over_65... | 16.9 |
| percentage_poverty_hhs_acs | 3 |
| total_unique_fiber_fabric_locati... | |
| unique_fiber_competitors_fcc | 35 |
| fiber_max_up_advertised_fcc | 1000 |
| fiber_max_down_advertised_fcc | 0 |
| count_unique_ftth_competitors... | NULL |
| count_unique_ftth_fabric_locati... | |

Figure 12A

1200
(another view)

| Feature | Value |
| --- | --- |
| count_unique_copper_consum... | 1 |
| total_unique_copper_consumer... | 20 |
| count_unique_copper_business... | 1 |
| total_unique_copper_business... | 20 |
| percentage_all_fiber_fabric_oc... | 17.6470588235294113 |
| percentage_ftth_fabric_occupa... | 0 |
| percentage_ftth_fabric_occupa... | 17.6470588235294113 |
| percentage_all_cable_fabric_oc... | 135.2941176470588 |
| percentage_cable_consumer_f... | 64.70588235294117 |
| percentage_cable_business_fa... | 111.76470588235294 |
| percentage_all_copper_fabric_... | 117.64705882352941 |
| percentage_copper_consumer_... | 117.64705882352941 |
| percentage_copper_business_f... | 117.64705882352941 |
| latency_ookla | 18 |
| upload_Mbps_ookla | 20.681 |
| download_Mbps_ookla | 240.213 |
| land_area | 231635 |
| water_area | 0 |
| state | NC |
| county | Craven |
| density_km2 | 73.39132687201848 |
| density_sqm | 190.08353659852787 |
| index_level_0 | 5057894 |

Figure 12B

SYSTEM AND METHOD FOR DEPLOYING A COMMUNICATION NETWORK

RELATED APPLICATIONS

This application is a continuation-in-part of U.S. application Ser. No. 18/625,128, filed Apr. 2, 2024, entitled "System and Method for Deploying A Communication Network," which is incorporated by reference herein in its entirety.

TECHNICAL FIELD

The invention relates to systems and methods for communication networks, and, more particularly, but not by way of limitation, is directed to technology for selecting geographic areas for deploying communication networks.

BACKGROUND

Communication networks are important for exchange of information. Communication service providers need to determine efficient ways for deploying communication networks. For example, Fiber-to-the-Home (FTTH) networks, or Fiber-to-the-Premise (FTTP) networks, use fiber optic cables to connect individual homes and businesses directly to the internet. These networks provide fast internet speeds (e.g., Gigabits-per-second) and stable and consistent connections. Expanding fiber networks requires identifying optimal geographic areas across multiple data dimensions. For example, expansion of these networks may require backhaul availability, access to utility poles, conduits, rights-of-way, and other critical infrastructure. Service providers may also need to collaborate with government entities or utility companies to expedite network expansion and overcome regulatory hurdles. Because expanding FTTH networks is capital-intensive, service providers may need to demonstrate benefits of expansion versus the cost, to secure funds and grants. It is also important for service providers to be able to analyze competing infrastructure to determine feasibility of adding connections. Conventional methods rely on static data and predefined heuristics, lacking adaptability to new data.

SUMMARY

Accordingly, there is a need for tools, systems and methods that address at least some of the problems described above. Described herein are systems, methods, tools and visualizations for deploying a communication network. These techniques help enable smart build sequencing to maximize build speed and efficiency of communication networks.

One or more embodiments of the invention are directed to an improved method and system for deploying communication networks. The method is performed at a computing system comprising a processor and memory. The method includes obtaining geospatial data corresponding to a plurality of blocks within a geographical area. The method also includes, for each cohort of a plurality of cohorts, performing a sequence of steps. The sequence of steps includes selecting as the respective cohort a block of the plurality of blocks. The sequence of steps also includes adding a buffer zone of a predetermined size around the respective cohort. The sequence of steps also includes appending to the respective cohort blocks of the plurality of blocks that touch the respective cohort or intersect with the buffer zone. The sequence of steps also includes repeating the adding and appending until there are no further blocks to add to the respective cohort. The method also includes ranking the plurality of cohorts based on the total number of premises within each respective cohort, and selecting where to deploy one or more communication networks based on the ranking.

In some embodiments, obtaining the plurality of blocks includes obtaining a collection of points having a common characteristic, clustering the points based on density and/or proximity to obtain the plurality of blocks. In some embodiments, each block is a polygon of a geographical area. a plurality of clusters, and/or building a polygonal surface for each cluster to obtain the plurality of blocks. In some embodiments, clustering the points generates a plurality of clusters, and obtaining the plurality of blocks includes building a polygonal surface for each cluster to obtain the plurality of blocks.

In some embodiments, the common characteristic is selected from a group consisting of: a region not served by fiber, demographics comprising household income, proximity to a road, geological composition of an area around a respective point, and a combination of the aforementioned.

In some embodiments, the method further includes, in accordance with a determination that the points are unavailable, forming polygonal shapes based on a plurality of census blocks, to obtain the plurality of blocks.

In some embodiments, the method further includes deploying communication networks in geographic areas based on the ranking of the plurality of cohorts.

In some embodiments, the method further includes deploying a communication network in the geographic area that corresponds to the highest ranked cohort of the plurality of cohorts.

In some embodiments, the method further includes, prior to the ranking, combining into a single cohort any cohorts that touch one another or have an intersecting buffer zone.

In some embodiments, the method further includes prior to the ranking, combining into a single cohort nearby cohorts that meet predetermined proximity criteria.

In some embodiments, the predetermined proximity criteria includes ratio of road footage to total premises count for a combined cohort being below a predetermined ratio.

In some embodiments, the predetermined proximity criteria is based on a distance between cohorts.

In some embodiments, the method further includes, after the obtaining and prior to the selecting, filtering blocks to only include those blocks that meet certain filtering criteria.

In some embodiments, the filtering criteria includes (i) a respective block having a premises density above a predetermined threshold, (ii) the respective block having at least a predetermined number of premises, (iii) there being no broadband internet access in the respective block, (iv) there being fewer than a predetermined number or percentage of premises within the respective block with broadband access, or (v) a ratio of the total length of road in the respective block to number of premises in the respective block being less than a predetermined number.

In some embodiments, the predetermined size of the buffer zone is approximately 30 to 100 meters.

In some embodiments, the predetermined size of the buffer zone is approximately 40 to 60 meters.

In some embodiments, the method further includes training a machine learning model using successful deployments of communication networks in blocks over time, and either (i) applying the machine learning model to new blocks in a geographic region to filter out unsuitable blocks from suitable blocks, or (ii) applying the machine learning model to rank the cohorts.

In some embodiments, the method further includes ranking the plurality of cohorts further based on build costs and available grant funding obtained from one or more records of national and regional networks and infrastructure.

In some embodiments, the method further includes identifying optimal starting points for cohort construction considering data factors, competition presence, and/or fastest routes to complete regional interconnection, thereby enabling build sequencing to maximize build speed and efficiency.

In some embodiments, the method further includes generating geographic and map visualizations based on the cohort regions.

According to another aspect, a method is provided for deploying a communication network. The method is performed at a computing system comprising a processor and memory. The method includes obtaining geospatial data corresponding to a plurality of blocks within a geographical area. The method also includes adding a buffer zone of a predetermined size around blocks of the plurality of blocks. The method also includes generating an undirected network graph by iterating through the plurality of blocks, starting with a candidate node representing a block, and adding (i) a new node representing each block whose buffer zone intersects with or touches the block, and (ii) an edge connecting the candidate node and the new node. The method also includes selecting an initial set of cohorts of blocks from the plurality of blocks. Each cohort in the initial set of cohorts corresponds to a respective connected component of the undirected network graph, and each cohort in the initial set of cohorts includes blocks in nodes of the respective connected component. The method also includes ranking each cohort in the initial set of cohorts based on a total number of premises in blocks within the respective cohort. The method also includes selecting where to deploy one or more communication networks based on the ranking.

In some embodiments, obtaining the plurality of blocks includes obtaining a collection of points having a common characteristic, clustering the points based on density and/or proximity to obtain the plurality of blocks. In some embodiments, each block is a polygon of a geographical area. a plurality of clusters, and/or building a polygonal surface for each cluster to obtain the plurality of blocks. In some embodiments, clustering the points generates a plurality of clusters, and obtaining the plurality of blocks includes building a polygonal surface for each cluster to obtain the plurality of blocks.

In some embodiments, the common characteristic is selected from a group consisting of: a region not served by fiber, demographics comprising household income, proximity to a road, geological composition of an area around a respective point, and a combination of the aforementioned.

In some embodiments, the method further includes, in accordance with a determination that the points are unavailable, forming polygonal shapes based on a plurality of census blocks, to obtain the plurality of blocks.

In some embodiments, the geospatial data includes associated data for each block including density of premises and broadband internet connections.

In some embodiments, the method further includes applying a set of filters to the geospatial data to select one or more blocks from the plurality of blocks, each block of the one or more blocks (i) having premises (e.g., homes) density above a predetermined threshold and (ii) having either no broadband internet connection using optical fiber or connection counts for a particular type of broadband internet connection that is less than a predetermined number of units in the block.

In some embodiments, applying the set of filters to the geospatial data includes selecting blocks that either have no broadband internet connection using optical fiber or have connection counts for a particular type of broadband internet connection that is less than a predetermined number of units in the block.

In some embodiments, the method further includes obtaining a geospatial representation of a state road network, generating a new set of cohorts by iterating through the initial set of cohorts based on the geospatial representation, and selecting where to deploy the one or more communication networks further based on the new set of cohorts.

In some embodiments, generating the new set of cohorts is based on calculating a total road length and a ratio P of road footage to total premises count, for a current cohort.

In some embodiments, generating the new set of cohorts includes iterating through cohorts K other than the current cohort J, including: calculating a length of total road within K; calculating an approximate inter-cohort distance R between J and K; adding summed road distances of J and K to the approximate inter-cohort distance R to obtain R2; determining a ratio P2 of a sum of total homes within J and K to the cumulative road distance R2; in accordance with a determination that P2 is below P, merging the cohorts J and K to obtain a merged cohort for a subsequent step; and in accordance with a determination that P2 is not below P, forgoing merging the cohorts J and K, to use J for the subsequent step.

In some embodiments, the approximate inter-cohort distance road distance R between J and K is determined by calculating shortest distance between boundaries of J and K and multiplying that value by 1.4.

In some embodiments, the method further includes, in accordance with a determination that P2 is below P, adding K to an exclusion list to not be considered for addition to other cohorts.

In some embodiments, the method further includes ranking each cohort in the new set of cohorts according to a total number of premises in blocks corresponding to the respective cohort.

In some embodiments, the method further includes repeating generating another new set of cohorts by iterating through the new set of cohorts.

In some embodiments, the method further includes computing convex hull of cohorts and while iterating through cohorts K, in accordance with a determination that convex hull of the current cohort J includes convex hull of the cohort K, merging the two cohorts, ignoring adherence to ratio P.

In some embodiments, the method further includes prior to iterating through the cohorts K other than the current cohort, clipping a road network data frame in the geospatial representation to those contained within a boundary of the current cohort J.

In some embodiments, the geospatial data includes a geospatial parquet file that includes a polygonal boundary for each block of the plurality of blocks, and wherein generating the undirected network graph comprises determining buffer zones that intersect with or touch the polygonal boundary of the block.

In another aspect, a method is provided for deploying a communication network. The method is performed at a computing system comprising a processor and memory. The method includes obtaining geospatial data that includes polygonal boundary of a plurality of blocks within a geographical area. The method includes dynamically selecting and prioritizing cohorts representing geographic areas for communication network construction using machine learning-based cohort modeling and multi-factor analysis of the geospatial data. The method also includes identifying and optimizing edge-out areas by constructing new cohorts based on proximity to existing builds and infrastructure in the geographic areas. The method also includes selecting where to deploy one or more communication networks based on the new cohorts.

In some embodiments, identifying and optimizing the edge-out area includes scoring factors in addressable homes, density, and cost feasibility, including sequencing edge-out versus new regions to maximize network competitive positioning.

In some embodiments, the method further includes maintaining a record of national and regional networks and infrastructure, including build costs and available grant funding, to determine optimal timing and ranking of full area builds remaining/available.

In some embodiments, the method further includes identifying optimal starting points for cohort construction considering data factors, competition presence, and/or fastest routes to complete regional interconnection, thereby enabling build sequencing to maximize build speed and efficiency.

In some embodiments, the method further includes continuously integrating new data sources into the geospatial data to refine and re-prioritize target geographic areas for communication network construction.

In some embodiments, obtaining geospatial data includes ingesting data from a plurality of disparate data sources including demographic statistics, competitor presence, and infrastructure maps, wherein the data sources include structured and unstructured sources.

In some embodiments, the method further includes, using machine learning-based cohort modeling includes inputting data from a plurality of disparate data sources to a machine learning algorithm that performs cohort modeling by adaptively connecting adjacent geographic areas into clusters that meet connectivity and construction thresholds.

In some embodiments, the method further includes using additional data layers to analyze and score each cohort, and selecting highest scoring cohorts for planning and construction.

In another aspect, a method is provided for deploying a communication network. The method is performed at a computing system comprising a processor and memory. The method includes ingesting and integrating geospatial data from a plurality of structured and unstructured data sources. The method also includes identifying an initial geographic area and constructing a connected cohort using buffering and graph algorithms. The method also includes analyzing infrastructure, competitive presence, demographics, and other attributes of the cohort to obtain one or more cohorts. The method also includes scoring and ranking the one or more cohorts based on one or more objective functions. The method also includes merging cohorts based on proximity and density thresholds. The method also includes selecting top ranking cohort regions for communication network construction and planning.

In some embodiments, the method further includes re-scoring and re-ranking cohorts as new data is ingested.

In some embodiments, the method further includes updating analytical and predictive models for subsequent area selection based on feedback from on-ground assessments.

In some embodiments, the method further includes generating communication network construction plans and work packages, based on the cohort regions.

In some embodiments, the method further includes generating geographic and map visualizations based on the cohort regions.

In some embodiments, analyzing competitive presence of the cohort includes classification of blocks for the geospatial data to assign a probability of false positives in competitive presence, using trained random forest classifiers.

In some embodiments, the trained random forest classifiers are trained using federal communications commission (FCC) broadband technology data, Internet speed test data, web scraper data, and in-person area assessment data.

In some embodiments, the trained random forest classifiers include approximately 100 tree classifiers.

In some embodiments, input data sources to these classifiers are aggregated at the block level before training.

In some embodiments, analyzing infrastructure of the cohort includes using image classification based on an implementation of the ResNet50 model that is trained on images of both positive and negative classes.

In some embodiments, analyzing infrastructure of the cohort includes using a pretrained vision-and-language transformer to assess satellite, aerial, and/or street view images for predetermined locations, wherein the vision-and-language-transformer uses a set of predetermined prompting questions to understand a presence of technologies in images, as opposed to discrete class assignments.

In some embodiments, a computer system has one or more processors, memory, and a display. The one or more programs include instructions for performing any of the methods described herein.

In some embodiments, a non-transitory computer readable storage medium stores one or more programs configured for execution by a computer system having one or more processors, memory, and a display. The one or more programs include instructions for performing any of the methods described herein.

BRIEF DESCRIPTION OF THE DRAWINGS

FIG. 2 is a system diagram of an example communication network dynamic geographic area selection server, according to some embodiments;

FIG. 5 shows a flowchart of an example method for deployment of communication networks, according to some embodiments;

FIG. 6 shows a flowchart of another example method for deployment of communication networks, according to some embodiments;

FIG. 7 shows a flowchart of another example method for deployment of communication networks, according to some embodiments; and FIG. 8 shows a flowchart of another example method for deployment of communication networks, according to some embodiments.

FIGS. 12A and 12B show example census information for a geographic area, according to some embodiments.

DETAILED DESCRIPTION OF THE PREFERRED EMBODIMENTS

The following descriptions of embodiments of the invention are exemplary, rather than limiting, and many variations and modifications are within the scope and spirit of the invention. Although numerous specific details are set forth in order to provide a thorough understanding of the present invention, it will be apparent to one of ordinary skill in the art, that embodiments of the invention may be practiced without these specific details. In other instances, well-known features have not been described in detail in order to avoid unnecessarily obscuring the present invention.

Figure 1A:
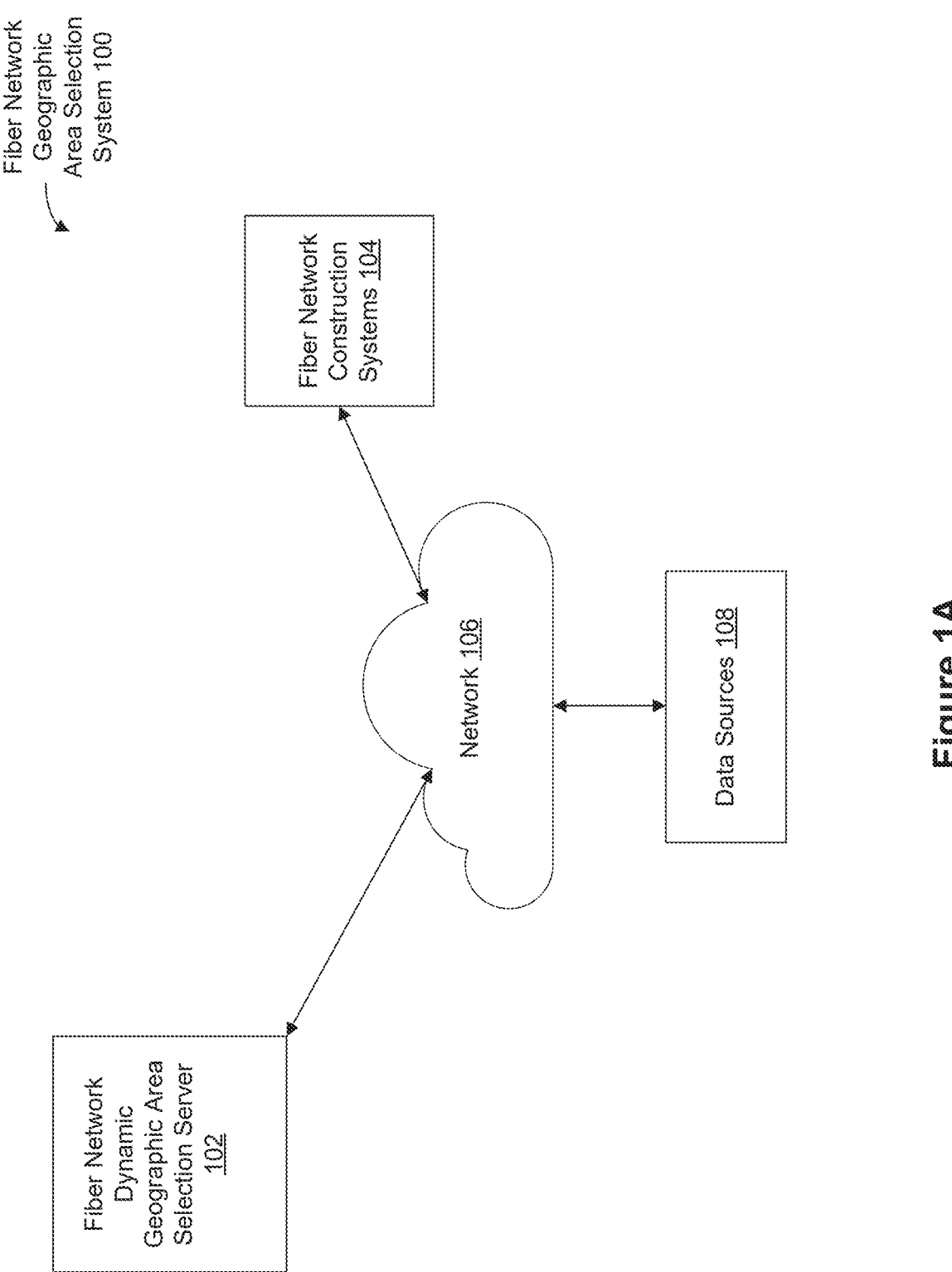
FIG. 1A is a schematic diagram of an example system for deployment of communication networks, according to some embodiments.

FIG. 1A is a schematic diagram of an example system 100 for deployment of communication networks, according to some embodiments. The system includes a communication network dynamic geographic area selection server 102 coupled to communication network construction systems 104 (sometimes referred to as communication networking planning and construction systems), and/or one or more data sources 108, via a network 106 (e.g., Internet). Each of the databases and/or servers may be configured to obtain corresponding data in real-time and/or at predetermined schedules (e.g., hourly, daily, weekly, monthly, etc.) and/or supply such data to the communication network dynamic geographic area selection server 102. Alternatively, or additionally, the server 102 may obtain such data from the databases or servers on a periodic basis.

One or more embodiments of the invention are directed to an improved method and system for dynamic selection of geographic areas for communication networks. Some embodiments of the communication network dynamic geographic area selection server 102 efficiently analyze large geographic regions across multiple data dimensions to identify optimal areas for communication network buildouts. It is noted that although the techniques are described herein with respect to communication networks, the techniques may be applied for any type of network buildouts (or even any type of resource buildouts in any type of geographic areas). Some embodiments dynamically cluster geographic areas into interconnected cohorts based on construction objectives. Some embodiments continuously integrate new data sources to refine and re-prioritize target geographic areas for network buildouts.

Figure 1B:
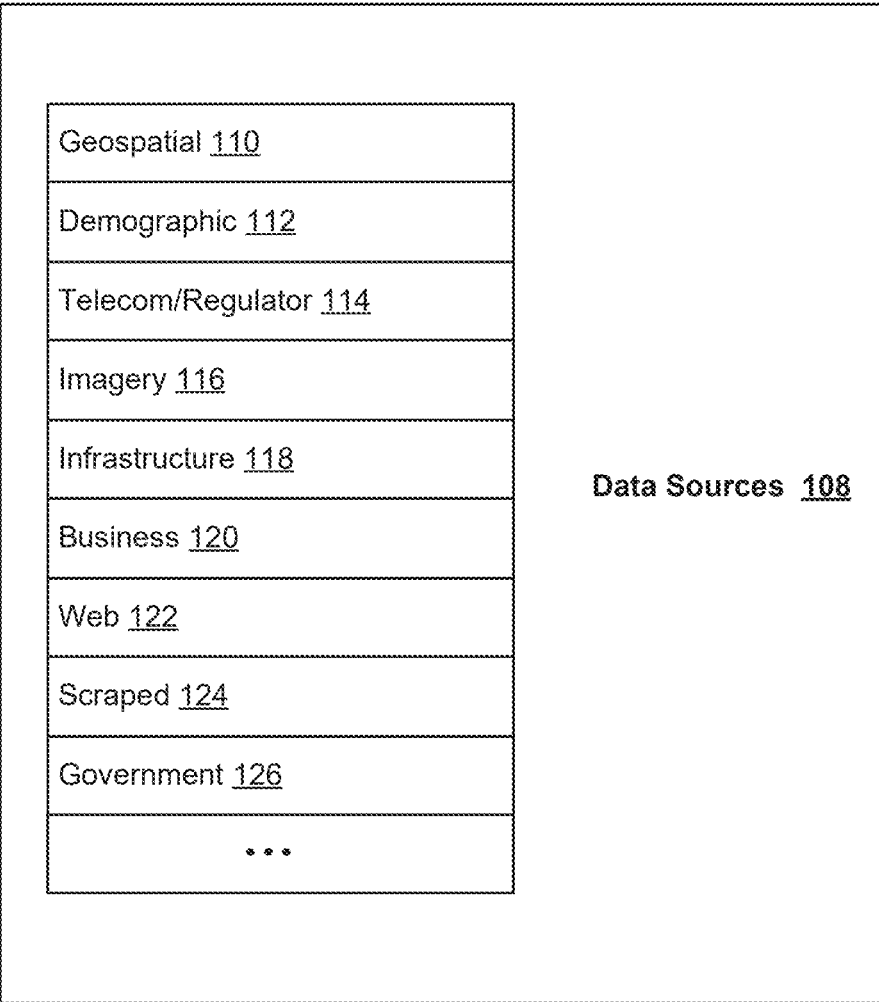
FIG. 1B is a block diagram of example data sources, according to some embodiments.

FIG. 1B is a block diagram of example data sources 108, according to some embodiments. The data sources 108 includes servers and/or databases for geospatial data 110, demographic data 112, telecom or regulator data 114, imagery data 116, infrastructure data 118, business data and/or business rules 120, web data 122, scraped data 124, and/or government data 126.

In some embodiments, the system (e.g., the server 102) described herein ingests disparate data sources, such as demographic statistics (e.g., from the demographic data 112), competitor presence (e.g., from the infrastructure data 118), and/or infrastructure maps (e.g., from the imagery data

116). In some embodiments, a machine learning algorithm performs cohort modeling by adaptively connecting adjacent geographic areas into cohorts that meet connectivity and construction thresholds. Additional data layers are integrated to analyze and score each cohort. The highest scoring cohorts are selected and passed to the planning and construction systems 104.

Various types of data may be input to the system. For example, geospatial data may include address points, boundary shapes, street maps, and/or backhaul information. Demographic data may include population, income, and/or age distributions. Telecom or regulatory data may include competitor presence, technology types, and/or speeds. Imagery data may include satellite, aerial, and/or street view. Infrastructure data may include road, poles, conduits, and/or utilities. Business data may include density, and/or industry types. Web data may include articles, social media, announcements and/or forums. Scrapping data may include aggregator, and/or competitor offerings/locations. Government data may include grant information. Business data may include field verification, engineering, survey, and/or sales data. Some embodiments use predetermined business rules, criteria, thresholds, and/or prompts. Some embodiments process the different inputs to output scored and ranked geographic cohorts, network construction plans and work packages, and/or geographic and map visualizations.

In some embodiments, the communication network construction systems 104 includes one or more servers, one or more storage devices, one or more networks, and/or other assets (e.g., physical systems, security devices, smart devices, including any Internet of Things or IoT devices), for constructing communication networks. In various embodiments, these components are coupled together via one or more private or public networks. In some embodiments, the communication network construction systems 104 orchestrates construction of communication networks, e.g., using and/or generating time sequences, starting and/or ending locations, routes, geographic areas, for deploying communication networks. The relevant data may be stored in the one or more storage devices. The one or more servers may include memory and/or processors, for generating the sequences, starting and/or ending locations, routes, geographic areas. The systems 104 may communicate with external devices for scheduling and/or coordinating constructions and/or deployment of communication networks. The systems 104 may also provide feedback to the server 102 (e.g., for providing data to retrain machine learning algorithms, or provide field data or other observations).

FIG. 2 is a system diagram of an example communication network dynamic geographic area selection server 102, according to some embodiments. The communication network dynamic geographic area selection server 102 typically includes one or more processor(s) 230 (e.g., Central Processing Units (CPUs) and/or Graphical Processing Units (GPUs)), a memory 200, a power supply 232, an input/output (I/O) subsystem 234, and a communication bus 228 for interconnecting these components. Processor(s) 230 execute modules, programs and/or instructions stored in memory 200 and thereby perform processing operations, including the methods described herein according to some embodiments. In some embodiments, the communication network dynamic geographic area selection server 102 also includes a display 244 for displaying visualizations (e.g., visualizations of network buildouts, candidate cohorts, geographic areas, affordances for selecting or force selecting some areas for inclusion). In some embodiments, the communication network dynamic geographic area selection server 102 generates displays or visualizations, and transmits the visualization (e.g., as a visual specification) to a client device (e.g., the communication network construction systems 104) for display. Some embodiments of the communication network dynamic geographic area selection server 102 include touch, selection, or other I/O mechanisms coupled to the communication network dynamic geographic area selection server 102 via the I/O subsystem 234, to process input from users that select (or deselect) visual elements of a displayed visualization. In some embodiments, the client device (or software therein) processes user input and transmits a signal to the communication network dynamic geographic area selection server 102 for processing. Some aspects of the communication network dynamic geographic area selection server 102 (e.g., the modules in the memory 200) are implemented in one or more client devices, according to some embodiments.

In some embodiments, the memory 200 stores one or more programs (e.g., sets of instructions), and/or data structures, collectively referred to as "modules" herein. In some embodiments, the memory 200, or the non-transitory computer readable storage medium of the memory 200, stores the following programs, modules, and data structures, or a subset or superset thereof:

an operating system 202;

a cohort modeling module 204 that models (or builds) cohorts of geographic areas or blocks (e.g., census blocks) based on model input data 206 obtained from any of the data source described above. The cohort modeling module includes a buffering module 208, a graph module 210, and/or a cohort ranking and selection module 212, details of which are described below in reference to FIGS. 3A-3N, 4, and 5, according to some embodiments;

an optional cluster identification module 214 for discrete geographic area classification or clustering, an example (unsupervised learning method) of which is described below, according to some embodiments. The cluster identification module 214 may include training data and a training module to train machine learning models used for identification of clusters. A cluster exists in non-cartesian space. Blocks in a cluster may not be in close geographical proximity. Instead, a cluster may be a collection of blocks that are found to aggregate in a lower dimensional embedding derived from an N-dimensional manifold. N is the number of data descriptors for a block, e.g., number of homes, average income, etc. In some embodiments, clustering is a part of segmentation analysis of similar, disparate blocks that may not be spatially adjacent or close but rather are descriptively similar. In some embodiments, cluster identification is trained on a dataframe where each row corresponds to a block, one column contains the block index or GEOID20 code, and the remaining columns are descriptors of that block, e.g., size, number of homes, number of competitors present in FCC data;

an optional infrastructure classification module 216 for classifying blocks, e.g., to assign the probability of false positives for presence of communication networks, an example of which is described below, according to some embodiments. The infrastructure classification module 216 may include training data and a training module to train machine learning models used for infrastructure classification. In some embodiments, machine learning model(s) for infrastructure classification of false positives is trained on ride-out data, web scraper information, Ookla speed test data and/or FCC information. In some embodiments, the machine learning algorithms assign a class based on a probability value, with a winner takes all strategy. For example, if the probability is 51% dog and 49% cat, the classification will be dog. In some embodiments, this probability-based decision is integrated into a random forest methodology; and/or an optional image classification module 218 for classifying presence or absence of infrastructure, such as specific types of communication towers, poles, infrastructure. The image classification module 218 may include training data and a training module to train machine learning models used for image classification. Image classification may be trained on various examples of poles and/or pole-like objects, e.g., trees, signposts.

The above identified modules (e.g., data structures, and/or programs including sets of instructions) need not be implemented as separate software programs, procedures, or modules, and thus various subsets of these modules may be combined or otherwise re-arranged in various embodiments. In some embodiments, memory 202 stores a subset of the modules identified above. In some embodiments, a database 236 (e.g., a local database and/or a remote database) stores one or more modules identified above and data associated with the modules. Furthermore, the memory 200 may store additional modules not described above. In some embodiments, the modules stored in memory 200, or a non-transitory computer readable storage medium of memory 200, provide instructions for implementing respective operations in the methods described below. In some embodiments, some or all of these modules may be implemented with specialized hardware circuits that subsume part or all of the module functionality. One or more of the above identified elements may be executed by the one or more of processor(s) 230.

I/O subsystem 234 communicatively couples the communication network dynamic geographic area selection server 102 to one or more devices, such as the communication network communication systems 104, and/or data sources 108, via a local and/or wide area communications network 106 (e.g., the Internet) via a wired and/or wireless connection. In some embodiments, the data sources push relevant information to the server 102. In some embodiments, the server 102 pulls relevant information from the data sources.

Communication bus 228 optionally includes circuitry (sometimes called a chipset) that interconnects and controls communications between system components.

Figure 3A:
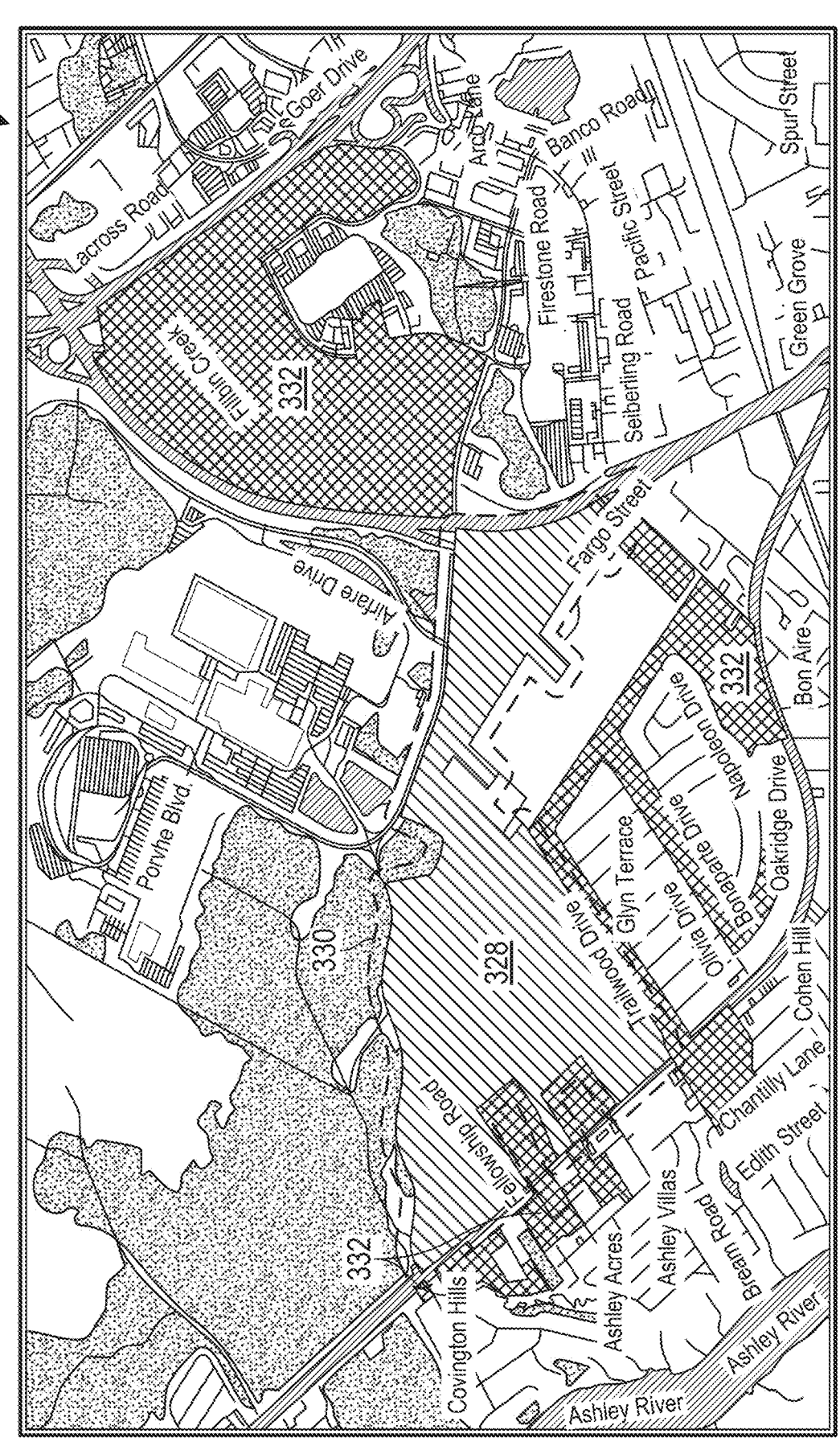
FIG. 3A-3N illustrate example cohort modeling processing steps, according to some embodiments.

FIG. 3A illustrates an example cohort modeling processing step 300, according to some embodiments. In some embodiments, the cohort modeling process (e.g., performed by the cohort modeling module 204) starts with an initially selected block (pattern 328). In some embodiments, a cohort is started that includes the initially selected block. A buffer zone (pattern 330) of a predetermined width is drawn (e.g., by the buffering module 208) around the block or blocks that touch the block or cohort or intersect with this buffer (pattern 332) are considered to be connected to the cohort and/or block. These blocks are added to the cohort. The predetermined width may include different ranges or sizes (e.g., 20-100 meters; 30-80 meters; 40-60 meters; 30 meters). These ranges may be determined based on different parameters and may be specific to applications. For example, the predetermined width or distance may be determined so as to allow blocks which straddle a highway of a certain width to be joined. In some instances, the distance could be used to not connect blocks that sit on either side of a river. In some embodiments, a network graph is iteratively built (e.g., by the graph module 210) using neighboring blocks that are connected to the selected block. In other embodiments, a new buffer is drawn around the expanded cohort and the process is repeated.

Figure 3B:
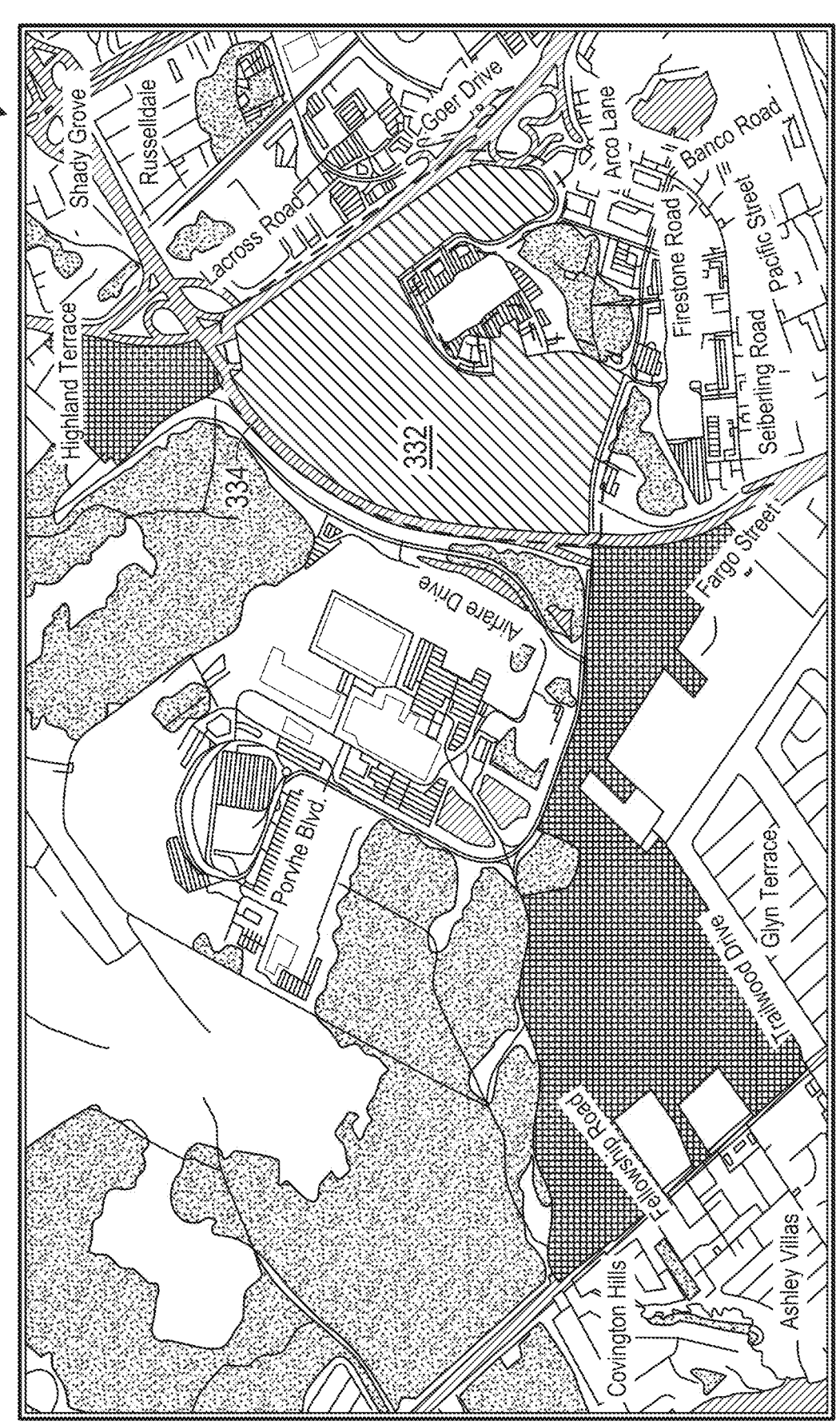

FIG. 3B illustrates an example cohort modeling processing step 302, according to some embodiments. In some embodiments, the algorithm (i.e., the cohort modeling process) then moves to another block (pattern 332) and draws a new buffer (pattern 334) around the block (pattern 332), and then again identifies neighbor blocks that touch the block (or cohort) or intersect with this buffer. These blocks are added to the cohort. FIG. 3B shows a block near Highland Terrace shared with one of the neighbors of the selected block in FIG. 3A. In some embodiments, a new buffer is drawn around the expanded cohort and the process is repeated.

Figure 3C:
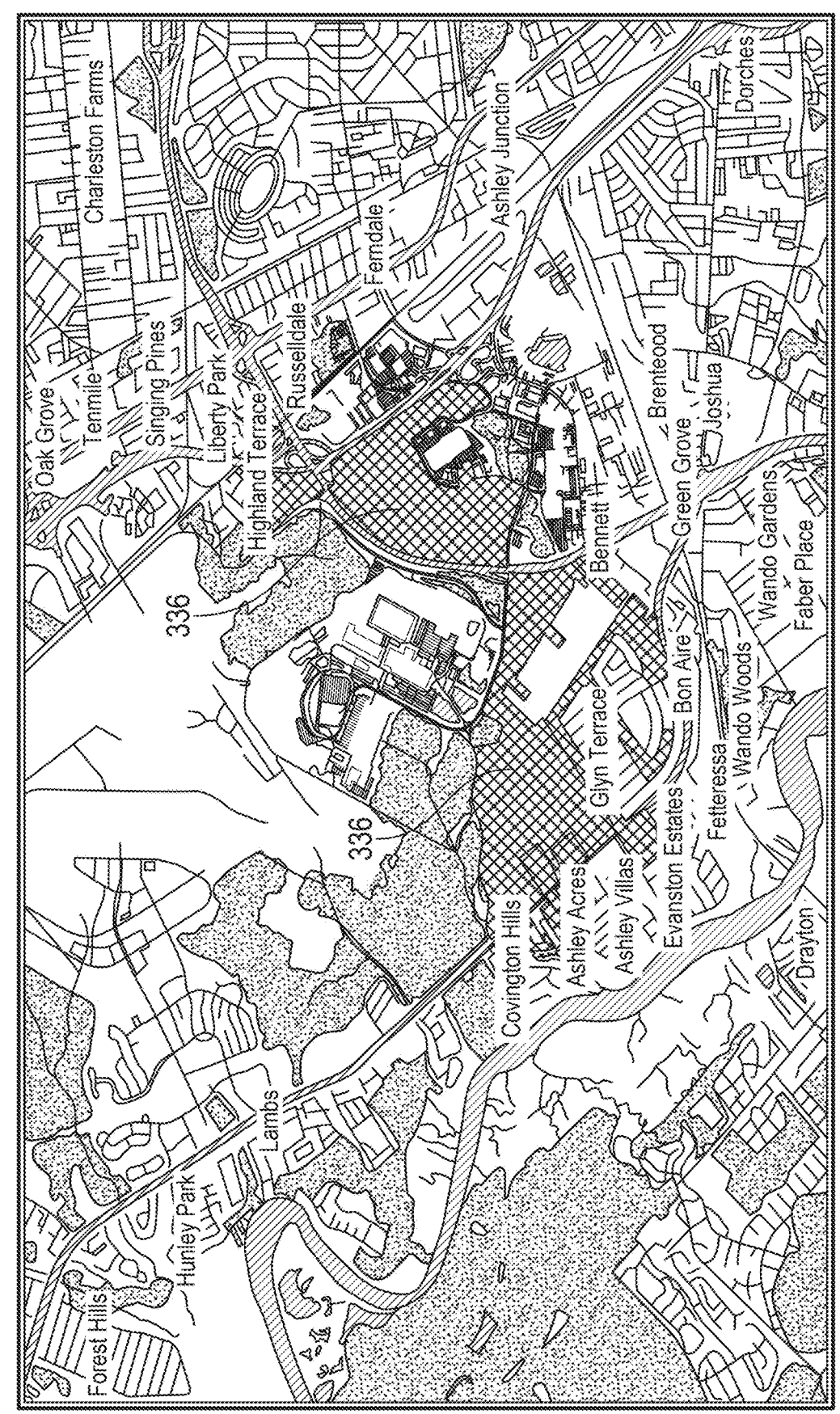

FIG. 3C illustrates an example cohort modeling processing step 304, according to some embodiments. The network has now been extended to include the Highland Terrace block, and the cohort (pattern 336) grows.

Figure 3D:

FIG. 3D illustrates an example cohort modeling processing step 306, according to some embodiments. This process continues until all contiguously connected blocks are added to a cohort for a region. FIG. 3D shows a large, fully connected cohort (pattern 338). The system then starts on a block in a new area to grow a different cohort.

Figure 3E:

FIG. 3E illustrates an example cohort modeling processing step 308, according to some embodiments. A road network (pattern 340) contained within these cohort blocks (pattern 338) is overlaid and the average road distance per home (or premise) is calculated for the whole cohort.

Figure 3F:

FIG. 3F illustrates an example cohort modeling processing step 310, according to some embodiments. The algorithm iterates through other connected cohorts, e.g. the one shown using pattern 342 and attempts to add them to the larger initial cohort provided.

Figure 3G:
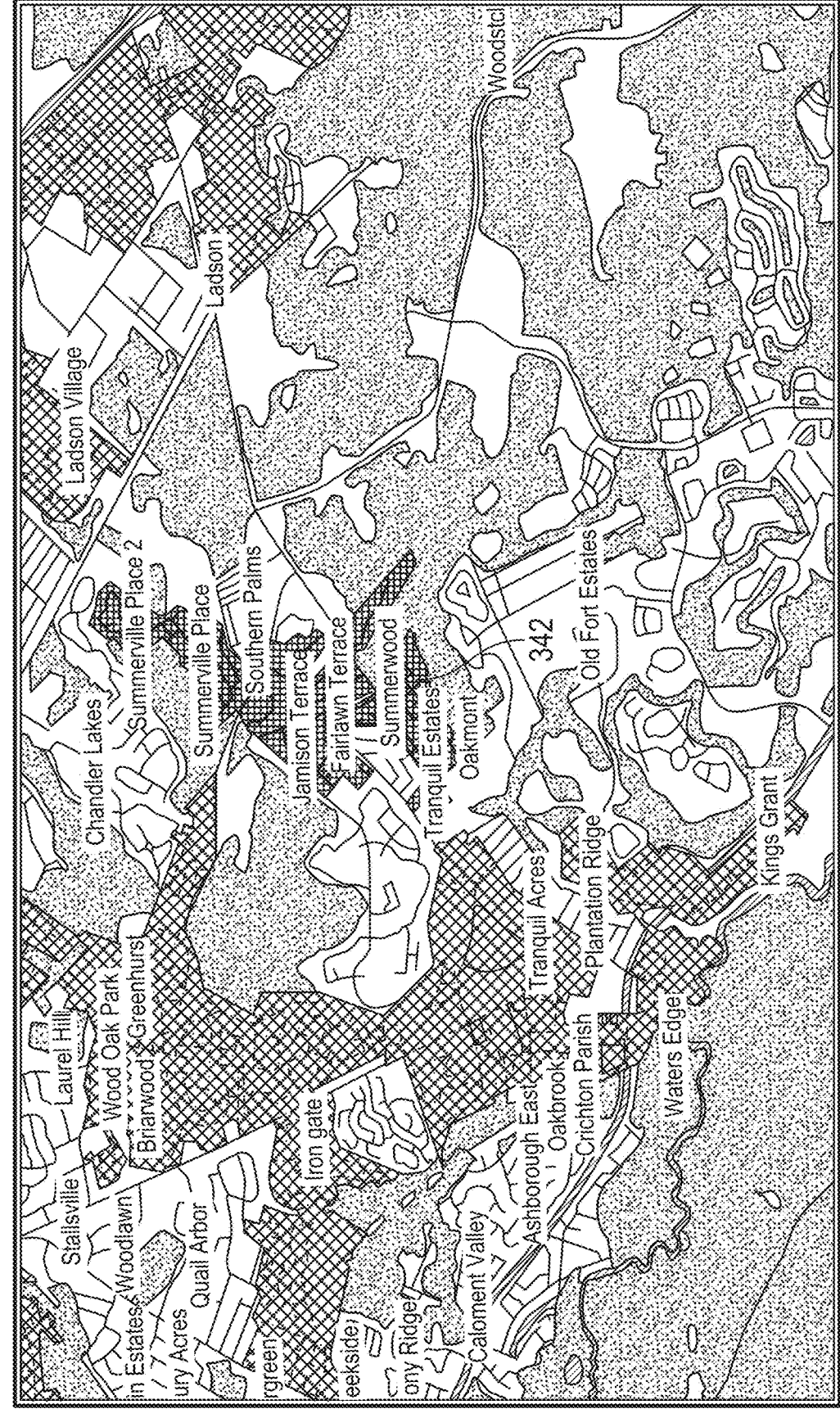

FIG. 3G illustrates an example cohort modeling processing step 312, according to some embodiments. A road per home (or premise) metric is calculated for this second cohort 342. The distance between the two cohorts (patterns 338 and 342) is also calculated. The algorithm then tests if the total houses of this second cohort, along with its road distances and inter-cohort distance, if added to the original cohort, will remain below a predetermined threshold (e.g., 75 feet per home, 85 feet per home, 95 feet per home). The threshold may be related to engineering costs. In other words, the system determines if it is worth adding the separated second cohort to the first cohort based on how many homes are in the second cohort and how far away the second cohort is to the first cohort. If there are a lot of homes in the second cohort and the distance between cohorts is short, then it would make sense to incur the cost of connecting the two cohorts to gain access to more homes. If the threshold is met, the second cohort is absorbed into the first cohort.

Figure 3H:

FIG. 3H illustrates an example cohort modeling processing step 314, according to some embodiments. This process is repeated or iterated to grow the largest possible cohorts that stay below the target threshold (e.g., 75 feet per home, 85 feet per home, 95 feet per home). The threshold may be related to engineering costs. The sizes of these cohorts are then considered alongside other indicators, such as speed test data, home occupancy rates, median home value, median household income, and age distribution. This allows for data-driven prioritization of new potential geographic areas.

Figure 3I:
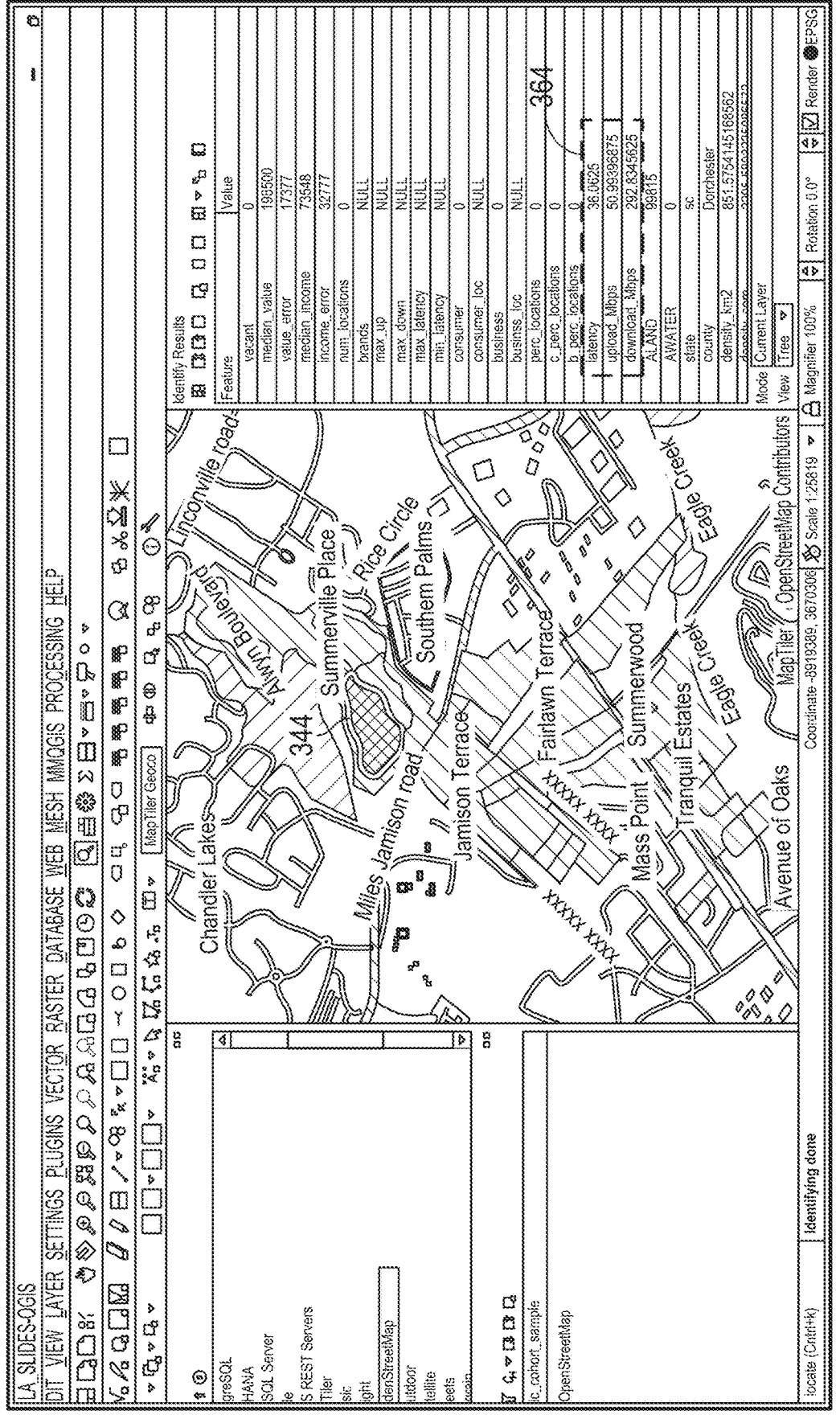

FIG. 3I illustrates an example cohort modeling processing step 316, according to some embodiments. Speed test data (e.g., OOKLA speedtest) is incorporated into the data layer to help confirm the presence of a fiber network, or the probable lack thereof. The speed values are mapped to the block layers and aggregated. The example shown in FIG. 3I indicates the following average speed/latency values 364 for the block (pattern 344): latency 36 milliseconds, upload speed 51 Megabits per second, and download speed 293 Megabits per second. This asymmetry may indicate (with or without confirmatory data from the FCC) that this block does not have access to a high speed communications network.

Figure 3J:
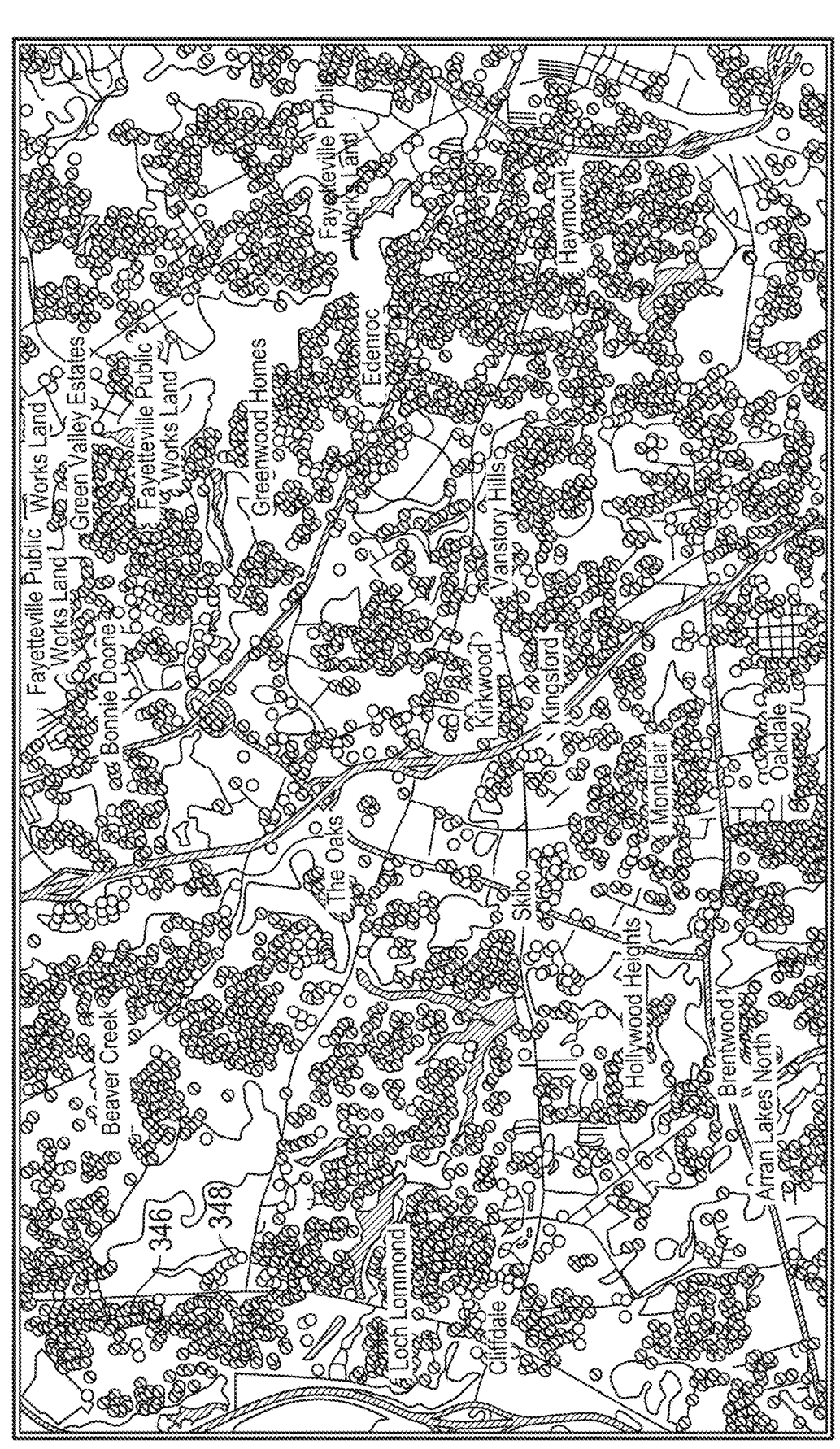

FIG. 3J illustrates an example cohort modeling processing step 318, according to some embodiments. In some embodiments, automated querying of websites (e.g., competitor websites which also deploy communication networks) provides a mechanism to verify the presence of preexisting network connections in a region. Sample addresses within selected blocks are submitted to communication service provider websites to determine if high-speed networks are available, and if so, what services are offered in the area. The map shown in FIG. 3J indicates where a company is present (pattern 346) and not present (pattern 348). The speed and technology types at each of these points can also be assessed to support the determination of fiber presence.

Figure 3K:
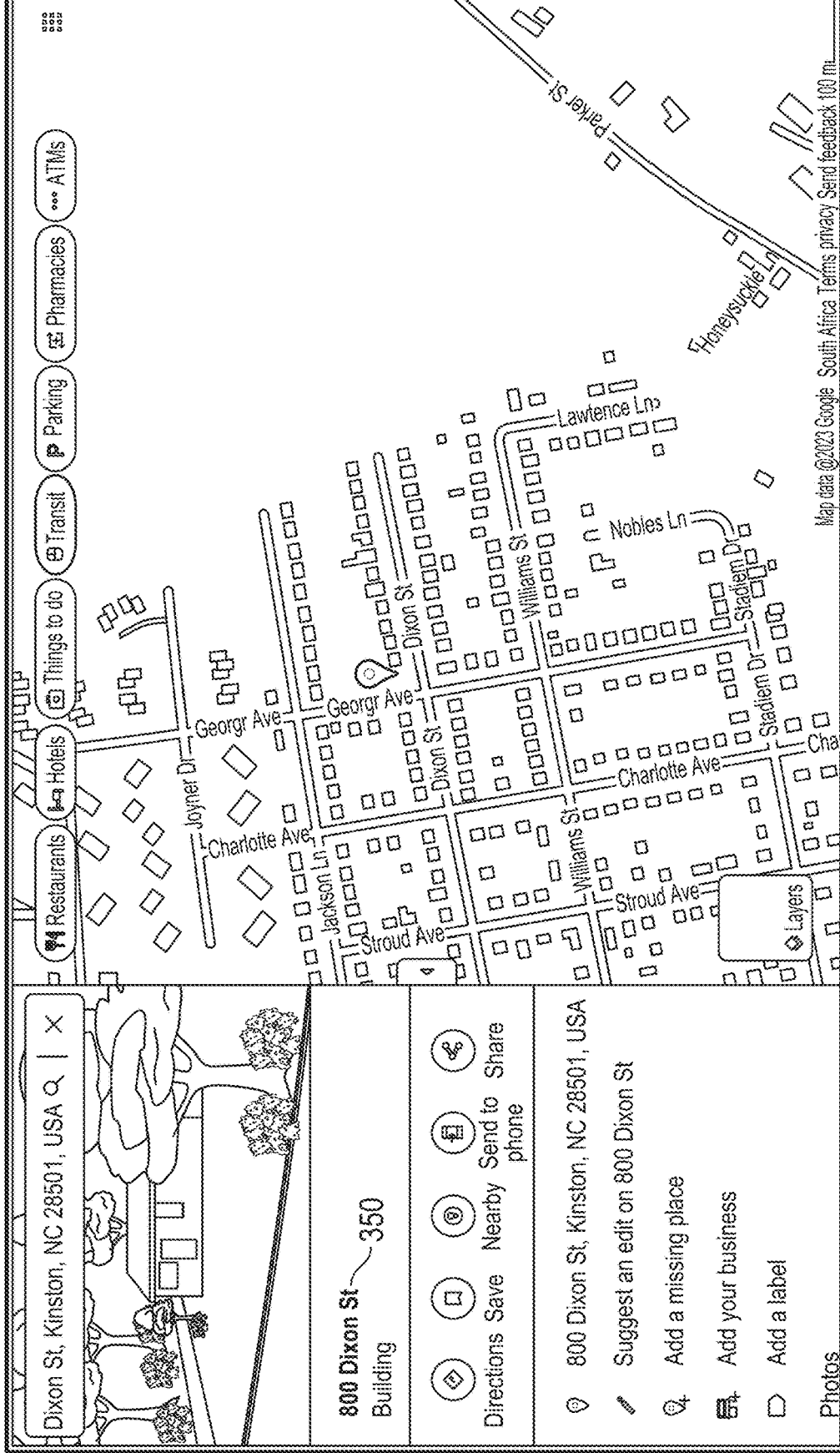

FIG. 3K illustrates an example cohort modeling processing step 320, according to some embodiments. The presence of utility pole infrastructure can be used to determine type of infrastructure. Some embodiments use one or more computer vision techniques to assess street view images (e.g., Google Street View) images for the presence of poles. The procedure starts by identifying an address within a block for assessment, e.g. 800 Dixon Street (labeled 350) shown in FIG. 3K.

Figure 3L:

FIG. 3L illustrates an example cohort modeling processing step 322, according to some embodiments. The street view images can be retrieved using geographic map APIs at various viewing angles. The images are then passed into a neural network classifier that indicates whether utility poles have been detected in the image. This methodology can be extended to other pieces of infrastructure through additional training of the algorithm. For example, coiled wire between poles may indicate the presence of copper connections (e.g., DSL or phone). These steps may be performed in the optional image classification module 218 and/or the infrastructure classification module 218. In some embodiments, a machine learning model is created by training the model using images tagged with poles or coils to build a model, and then feeding the model new images to identity poles, coils, or other infrastructure.

Figure 3M:

FIG. 3M illustrates an example cohort modeling processing step 324, according to some embodiments. The locations of pole infrastructure can be assessed for areas of interest in an automated fashion. This further assists the area identification process. For example, the area 352 is identified in FIG. 3M based on a pole infrastructure image. FIG. 3M shows geospatial points used to denote the presence of poles in the image (e.g., an image taken using Google street view). The presence of poles may be used in the deployment of communication networks. For example, if there is infrastructure in place, fiber can be run from pole to pole above ground, without requiring trenching.

Figure 3N:
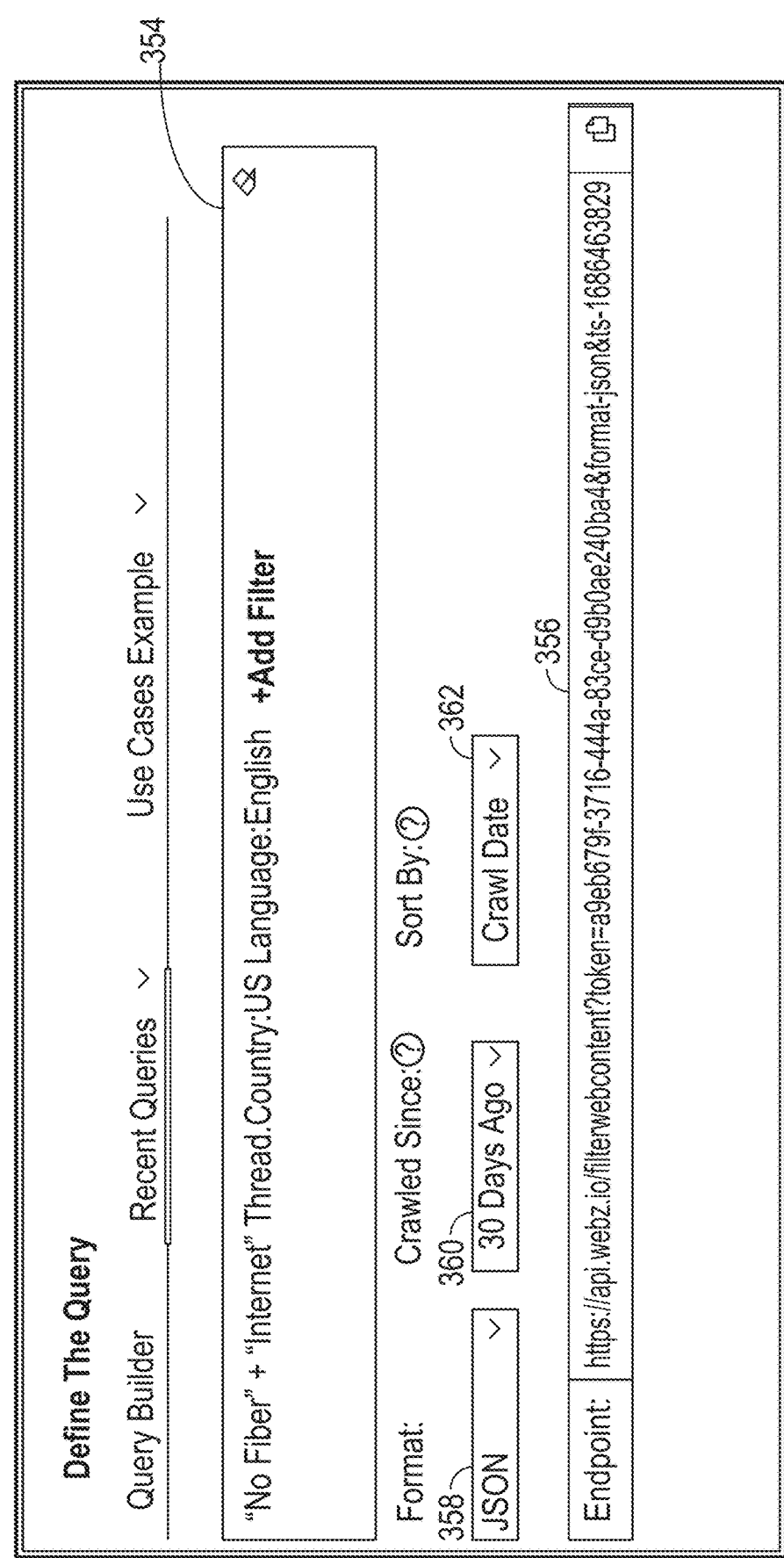

FIG. 3N illustrates an example cohort modeling processing step 326, according to some embodiments. Media releases (e.g., obtained from scraping data 122) can provide a valuable source of information on where competing communication networks are laid and/or where competitors may be expanding. Utilizing third party media web scrapers can identify posts and articles in which competitor names are mentioned. The articles can then be processed with natural language processing to identify the locations discussed in the text. The system can then flag certain posts for human assessment and confirmation of networks laid and/or competitor movements. FIG. 3N shows an example query 354 for a search with an endpoint 356, a format (e.g., JSON) 358 for the data to be retrieved, a last crawl date 360, and a sort by crawl date 362, to perform the scraping. The techniques described herein can be used to better inform the deployment system as to the areas that are better for deploying fiber than others, and/or such information may be taken into account for the ranking.

Some embodiments ingest and integrate data from various structured and unstructured sources, such as the data sources described above. Some embodiments identify an initial geographic area and construct a connected cohort using buffering and graph algorithms. Some embodiments analyze infrastructure, competitive presence, demographics, and/or other attributes of the cohort. Some embodiments score and rank cohorts based on configured objective functions. Some embodiments dynamically merge cohorts based on proximity and density thresholds. Some embodiments re-score and re-rank cohorts as new data is ingested. Some embodiments select top ranking cohort regions for network construction and planning. In some embodiments, feedback data from on-ground assessments is used to update analytical and predictive models for subsequent area selection.

Some of the advantages of the systems and methods described herein include adaptive cohort formation using machine learning, multi-factorial market analysis from diverse data sources, continuous re-optimization as new data is ingested, reduced reliance on manual processes, accelerated identification of optimal markets, and maximized return-on-investment through data-driven build sequencing. The techniques described herein may be used for identifying or selecting different types of areas, not just for fiber rollout. For example, the techniques can be used for determining areas for newspaper distribution, building out any other type of infrastructure like energy, where to send operatives for political door-to-door canvassing, mosquito or other pest abatement, identifying areas where infectious disease may spread; determining serviceability by emergency personnel; determining political districts; or the like.

Some embodiments define a geographic unit to encompass a geographic region, subdivision, or geometry for which relevant data is available. Example data include availability of broadband internet provision, home value, ability to pay, data usage habits, proximity to bodies of water or bridges, terrain type, presence of street poles, or predominant building types. A geographic unit may be defined based on official boundaries (e.g., blocks, zip codes, counties, cities), user-defined zones, or arbitrary geometries. A geographic unit may be determined by analyzing the attributes and/or clustering of underlying data points (e.g., geographic coordinates, addresses, buildings, infrastructure elements) followed by the generation of polygons to encompass these points, or line segments containing the points or their projections, with or without buffering zones.

Example Machine Learning Algorithms

In some embodiments, the cluster identification module 214 performs segment analysis or discrete market classification, using a combination of t-distributed Stochastic Neighbor Embedding (t-SNE) for dimensionality reduction followed by a hierarchical density based clustering algorithm (e.g., HDBSCAN) to identify clusters. The dimensions referred to here are the number of descriptors, e.g., columns of a data table where each row represents a block and the columns are indicators, such as size, number of homes, and total competitors. This N dimensional space is then reduced to a 3-dimensional space using a method, such as t-SNE or PCA. HDBSCAN is a hierarchical density based clustering algorithm that assigns blocks that are in close proximity to each other in this 3-D embedding to clusters. The training data for this unsupervised learning procedure may include a set of internal indicators (e.g., size, number of homes, number of competitors), extracted across different data input streams, used either en masse or in select combinations. This step may be used to prepare input data for subsequent analysis.

In some embodiments, the cluster identification module 214 analyzes attributes and/or spatial relationships of individual locations (e.g., homes, premises) across a territory (e.g., the entire United States) to identify groups or clusters of locations sharing one or more common attributes. Example common attributes include spatial proximity to one another, belonging to the same market segment, spending habits, Internet subscription preferences, or existing along the same road segment. Defining geographic units based on the clustering of individual locations, instead of or in addition to using predefined boundaries (e.g., census blocks), allows for a more flexible and data-driven optimization of network deployment. For example, rather than relying on boundaries primarily associated with surveying, e.g., the national census, the techniques described herein allow for clusters to be defined based on optimal network construction, localized density, and/or the needs of users of that network. Flexibility is enhanced as the clusters can be defined using information specific to the individual points that comprise them, as opposed to the average characteristics of the boundary that includes the individual points. The methods described herein can be adapted to work with any type of geographic unit appropriate for the use case and available data. Example geographic units include points, line segments or paths, polygons, and multi-polygon collections. The process of grouping individual locations together based on their attributes and spatial relationships is sometimes referred to as clustering. In some embodiments, the infrastructure classification module 216 performs classification of blocks to identify false positives in Federal Communication Commission (FCC) reports that help identify presence of communication networks. More generally, machine learning can be used to help filter out data that has errors in it, e.g., incorrect FCC data. Some embodiments use random forest classifiers. In some embodiments, the classifiers include approximately hundred tree classifiers. Algorithm hyperparameters may be tuned on a case-by-case basis with multiple rounds of cross-validation. Algorithm hyperparameters can include number of random trees, rounds of cross validation, stopping criterion, tree search method, number of branching steps, and/or use of boosting steps. In some embodiments, the input data sources to the classifiers are aggregated at a block level before training and may include FCC broadband technology data, speed test data (e.g., OOKLA test data), web scraper data, and/or in-person, area assessment data. Some embodiments use machine learning models after actual deployment, e.g., after cost or ease of deployment has occurred, to rank cohorts.

In some embodiments, the image classification module 218 performs image classification of infrastructure (e.g., poles, satellite dishes, pools, number of homes per pole, poles between homes) using either an implementation of the ResNet50 model, trained on images of both positive and negative classes, or a pretrained vision and language transformer (e.g., Vision-and-Language Transformer (ViLT) released under the Apache 2.0 license). Both systems may be used to assess street view images (e.g., Google Street View images) collected at predetermined (strategic) locations. Some embodiments use a set of prompting questions to understand the presence of technologies in images, as opposed to discrete class assignments. Example prompting questions include "Are poles in the foreground or background", "are satellite dishes present", "how many cars are in the image."

Example Cohort Modeling Algorithm

In some embodiments, the cohort modeling algorithm described herein is coded in Python. Some embodiments identify appropriate, spatially contiguous collections of blocks and iteratively aggregates these within certain parameters and thresholds. Example steps of the algorithm are described below, according to some embodiments.

In some embodiments, the system obtains a geospatial parquet file containing polygonal boundary of blocks within a geographic area (e.g., a state of interest) and their associated data indicators. In some embodiments, the system applies a series of filters to a dataframe to select blocks that align with a predetermined criteria. Example filters include housing density (e.g., a density of fifty houses per square-Kilometre), no FTTH competitors, or a competitor connection count that is less than or equal to a predetermined number (e.g., 5% of the number of homes in the block). In some embodiments, the filters are extensible and can be constructed from any combination of existing indicators and their associated thresholds. Some embodiments select areas based on competition, e.g., symmetrical residential Gigabit Internet availability. For example, based on field verification, symmetrical speed may not be available in a region or area, so that area may be selected. Some embodiments prioritize areas with one or zero multi-service operator. Some embodiments use demographics, such as household occupants greater than a predetermined number (e.g., 2 or 3), average home value greater than a predetermined value (e.g., $350,000), household income greater than a predetermined amount (e.g., greater than $75,000 per annum), population growth, percentage below poverty line, percentage population over certain age being below a percentage (e.g., 20%), and combinations thereof. Some embodiments target construction length per home (e.g., less than 85 feet per home). Some embodiments optimize or target driving radius. For example, target areas may need to be within a 3-hour driving radius to ensure that a storefront can service customers and/or field engineers can cover the whole area. Some embodiments determine a presence of adequate dark fiber or wavelength backhaul providers to support construction of a network. Primary and/or secondary backhaul may be required.

In some embodiments, a buffer zone of a predetermined width (e.g., a fifty meter buffer zone) is constructed around remaining blocks. In some embodiments, an empty, undirected network graph G is constructed (e.g., using NetworkX python module). In some embodiments, the system iterates through blocks and performs the following actions: (a) select all blocks whose buffer zones intersect or touch the current node, and (b) for each block in this selection, a node is added to G and an edge is constructed between the node and the current node. In some embodiments, connected components in the graph are identified (e.g., using the connected components function in NetworkX), and these connected components form a V1 set of cohorts. The V1 cohorts are ranked according to total number of homes they contain (descending), calculated through summing the per-block values for all blocks in the cohort.

In some embodiments, a geospatial representation of a road network (e.g., a state road network) is obtained. In some embodiments, the system iterates through the sorted V1 cohort list and performs the following actions: (a) the road network dataframe is clipped to those contained within the boundary of the currently selected cohort J; (b) the total road length is calculated for the cohort and the ratio of road footage to total house count is determined, P, where this ratio is tunable (e.g., 75, 85, 95); (c) all other cohorts K are then iterated through and the following steps are performed. The length of total road within K is calculated in the manner described above. The shortest distance between the boundaries of J and K is determined and multiplied by 1.4 to approximate the road distance R between J and K. The summed road distances of J and K are added to the inter-cohort distance R to produce R2. A ratio P2 of the summed total homes within J and K to the cumulative road distance R2 is determined. In some embodiments, if P2 is below the global threshold P, cohorts J and K are merged and this merged cohort proceeds (as input) to the next step of the iteration. K is added to an exclusion list to not be considered for addition to other cohorts. In some embodiments, if P2 is not below the threshold, the merge does not occur and J proceeds to the next step of the iteration. An output of the previous steps is a set of aggregated cohorts V2 that all satisfy the ratio P. In some embodiments, the cohorts in V2 are sorted according to total homes (descending) and prior steps (or a portion thereof) are repeated on V2 to create V3. In some embodiments, an optional step includes calculating convex hulls of cohorts and the sorted V3 set is iterated through, where if the convex hull of the current cohort J contains the convex hull of another cohort, K, the two are merged, ignoring adherence to the ratio P.

In some embodiments, clusters are ranked and/or prioritized based on factors, such as the number of locations within each cluster, the total length of road within the cluster boundary, possible connectivity patterns between points and their projections onto line segments, proximity to existing infrastructure, and/or other relevant criteria. Example criteria include home value, internet usage habits, broadband availability, network quality, terrain type, and building type. The highest priority clusters are selected as the target geographic units for deployment of the communication network. The resulting groups of locations that form the target geographic units for network deployment are sometimes referred to as cohorts.

Some embodiments process location data across an entire territory (e.g. the entire United States) to identify optimal geographic units, define geographic units based on the clustering of individual locations instead of, or in addition to, using predefined boundaries, and prioritize the resulting clusters based on relevant criteria, including possible connectivity patterns or paths through the cluster components, to optimize network deployment. Some embodiments use the geographic coordinates (latitude/longitude) of individual location (e.g., home, premise) as input data for the clustering process. Some embodiments analyze the attributes and spatial relationships between the locations to identify clusters of locations that are suitable for network deployment.

Figure 4:
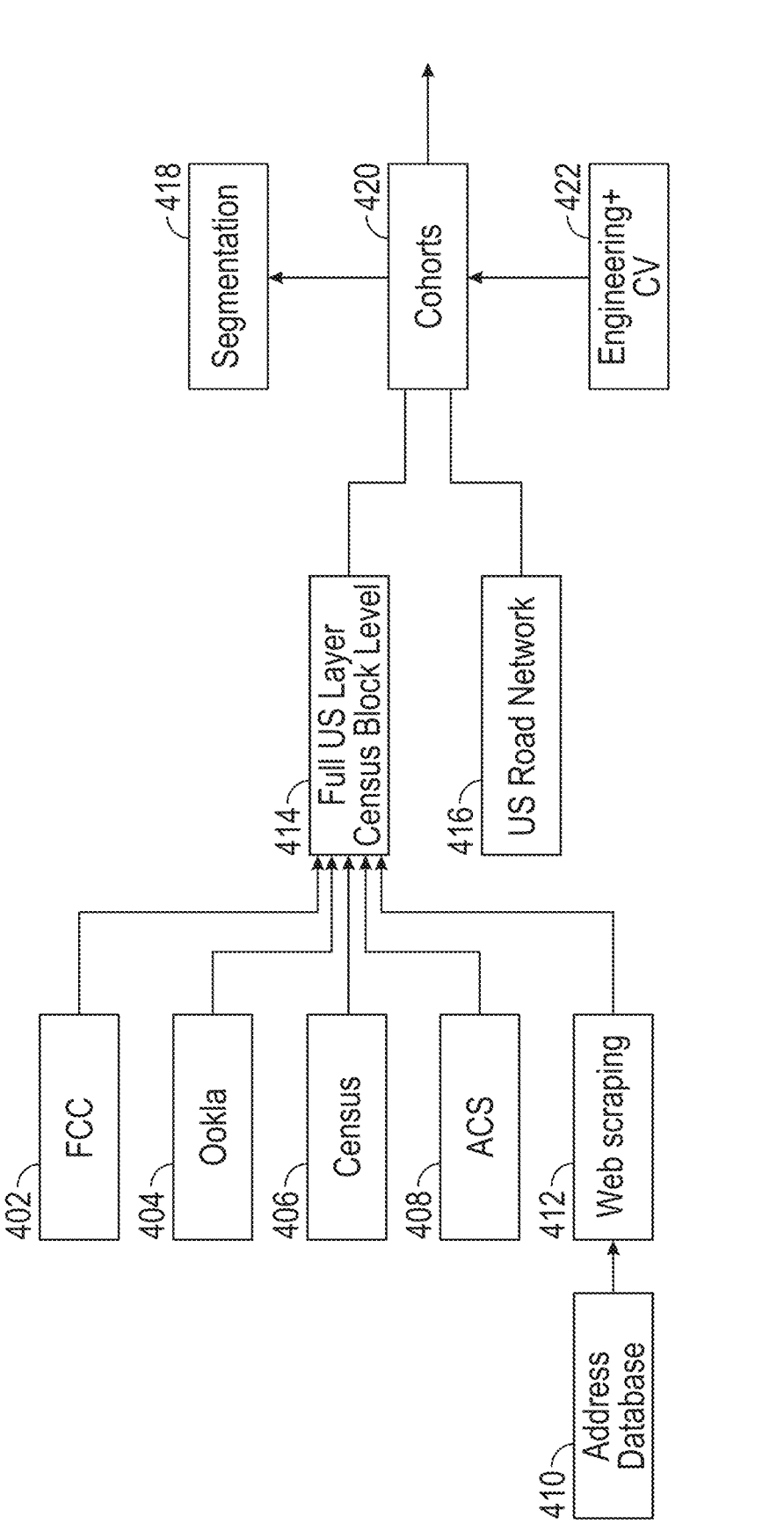
FIG. 4 is a block diagram of an example system for deployment of communication networks, according to some embodiments.

FIG. 4 is a block diagram of an example system 400 for deployment of communication networks, according to some embodiments. Data from FCC 402, speed test data 404 (e.g., Ookla data), census data 406, American Community Survey (ACS) data 408 and/or web scraping data 412 (based on an address database 410, an example of which is described above in reference to FIG. 3N) are used to generate a full data layer 414 at a census block level. The system 400 (e.g., implemented using the modules of the server 102) performs cohort modeling using the data layer. In some embodiments, a road network 416 is overlaid, an example of which is described above in reference to FIG. 3E. This information can also be used in the cohort modeling. Some embodiments perform computer vision methods 422 and/or segmentation 418, prior to and/or subsequent to cohort modeling process.

FIG. 5 shows a flowchart of an example method 500 for deployment of communication networks, according to some embodiments. The method is performed at a computing system (e.g., by the cohort modeling module 204 of the server 102) comprising a processor and memory.

The method includes obtaining (502) geospatial data (e.g., from geospatial data 110) corresponding to a plurality of blocks within a geographical area. The method also includes, for each cohort of a plurality of cohorts, performing (504) a sequence of steps. The sequence of steps includes selecting (506) as the respective cohort a block of the plurality of blocks. Typically, cohorts are selected based on their size (e.g., based on total number of houses); the largest cohort is selected followed by smaller cohorts. Initially the cohort is the block. The sequence of steps also includes adding (508) a buffer zone of a predetermined size around the respective cohort. As the cohort only includes the one block, this step is effectively adding the buffer to the census block. The sequence of steps also includes appending (510) to the respective cohort blocks of the plurality of blocks that touch the respective cohort or intersect with the buffer zone. The sequence of steps also includes repeating (512) the adding and appending until there are no further blocks to add to the respective cohort.

The method also includes ranking (514) the plurality of cohorts based on the total number of premises within each respective cohort, and selecting (516) where to deploy one or more communication networks based on the ranking. In some embodiments, the method further includes, prior to the ranking, combining into a single cohort any cohorts that touch one another or have an intersecting buffer zone.

Examples of the steps in FIG. 5 and the various embodiments of the method 500 are described above in reference to FIGS. 3A-3N, according to some embodiments.

In some embodiments, obtaining the plurality of blocks includes obtaining a collection of points having a common characteristic, clustering the points based on density and/or proximity to obtain the plurality of blocks. In some embodiments, each block is a polygon of a geographical area. a plurality of clusters, and/or building a polygonal surface for each cluster to obtain the plurality of blocks. In some embodiments, clustering the points generates a plurality of clusters, and obtaining the plurality of blocks includes building a polygonal surface for each cluster to obtain the plurality of blocks. A polygonal surface can include a mesh for 3-D, a convex hull, and/or a concave hull, which may be generated using linear algebra and/or geometry, for each cluster of points to obtain the plurality of blocks.

In some embodiments, the common characteristic is selected from a group consisting of: a region not served by fiber, demographics comprising household income, proximity to a road, geological composition of an area around a respective point, and a combination of the aforementioned.

In some embodiments, the method further includes, in accordance with a determination that the points are unavailable, forming polygonal shapes (e.g., rectangles, different shaped polygons) based on a plurality of census blocks, to obtain the plurality of blocks.

In some embodiments, the method further includes deploying communication networks in geographic areas based on the ranking of the plurality of cohorts.

In some embodiments, the method further includes deploying a communication network in the geographic area that corresponds to the highest ranked cohort of the plurality of cohorts.

In some embodiments, the method further includes prior to the ranking, combining into a single cohort nearby cohorts that meet predetermined proximity criteria.

In some embodiments, the predetermined proximity criteria includes ratio of road footage to total premises count for a combined cohort being below a predetermined ratio.

In some embodiments, the predetermined proximity criteria is based on a distance between cohorts. One way of calculating the distance is to take the shortest distance between cohorts (or between boundaries of cohorts) multiplied by a predetermined factor (e.g., 1.4). In some embodiments, this factor is below a maximum predetermined threshold (e.g., 75, 85, 95).

includes shortest distance between boundaries of the nearby cohorts multiplied by a predetermined factor (e.g., 1.4) being below a predetermined threshold.

In some embodiments, the method further includes, after the obtaining and prior to the selecting, filtering blocks to only include those blocks that meet certain filtering criteria.

In some embodiments, the filtering criteria includes (i) a respective block having a premises (e.g., homes, offices) density above a predetermined threshold, (ii) the respective block having at least a predetermined number of premises, (iii) there being no broadband internet access in the respective block, (iv) there being fewer than a predetermined number or percentage of premises within the respective block with broadband access, or (v) a ratio of the total length of road in the respective block to number of premises in the respective block being less than a predetermined number.

In some embodiments, the predetermined size of the buffer zone is approximately 30 to 100 meters.

In some embodiments, the predetermined size of the buffer zone is approximately 40 to 60 meters.

In some embodiments, the method further includes training a machine learning model using successful deployments of communication networks in blocks over time, and either (i) applying the machine learning model to new blocks in a geographic region to filter out unsuitable blocks from suitable blocks, or (ii) applying the machine learning model to rank the cohorts.

In some embodiments, the method further includes ranking the plurality of cohorts further based on build costs and available grant funding obtained from one or more records of national and regional networks and infrastructure.

In some embodiments, the method further includes identifying optimal starting points for cohort construction considering data factors, competition presence (e.g., if there are competitors, avoid that area, start somewhere else), and/or fastest routes to complete regional interconnection, thereby enabling build sequencing to maximize build speed and efficiency. Optimal starting points can include cohorts containing already built areas, or cohorts having proximity to existing infrastructure like backhaul.

In some embodiments, the method further includes generating geographic and map visualizations based on the cohort regions.

FIG. 6 shows a flowchart of another example method 600 for deployment of communication networks, according to some embodiments. The method is performed at a computing system (e.g., by the cohort modeling module 204 of the server 102) comprising a processor and memory. The method includes obtaining (602) geospatial data corresponding to a plurality of blocks within a geographical area. In some embodiments, the geospatial data includes associated data for each block including density of premises and broadband internet connections.

In some embodiments, obtaining the plurality of blocks includes obtaining a collection of points having a common characteristic, clustering the points based on density and/or proximity to obtain the plurality of blocks. In some embodiments, each block is a polygon of a geographical area. a plurality of clusters, and/or building a polygonal surface for each cluster to obtain the plurality of blocks. In some embodiments, clustering the points generates a plurality of clusters, and obtaining the plurality of blocks includes building a polygonal surface for each cluster to obtain the plurality of blocks. A polygonal surface can include a mesh for 3-D, a convex hull, and/or a concave hull, which may be generated using linear algebra and/or geometry, for each cluster of points to obtain the plurality of blocks.

In some embodiments, the common characteristic is selected from a group consisting of: a region not served by fiber, demographics comprising household income, proximity to a road, geological composition of an area around a respective point, and a combination of the aforementioned.

In some embodiments, the method further includes, in accordance with a determination that the points are unavailable, forming polygonal shapes (e.g., rectangles, different shaped polygons) based on a plurality of census blocks, to obtain the plurality of blocks.

In some embodiments, the method further includes applying a set of filters to the geospatial data to select one or more blocks from the plurality of blocks, each block of the one or more blocks (i) having premises (e.g., homes, offices) density above a predetermined threshold and (ii) having either no broadband internet connection using optical fiber or connection counts for a particular type of broadband internet connection that is less than a predetermined number of units in the block.

In some embodiments, applying the set of filters to the geospatial data includes selecting blocks that either have no broadband internet connection using optical fiber or have connection counts for a particular type of broadband internet connection that is less than a predetermined number of units in the block.

The method also includes adding (604) a buffer zone of a predetermined size around blocks of the plurality of blocks.

The method also includes generating (606) an undirected network graph by iterating through the plurality of blocks, starting with a candidate node representing a block, and adding (i) a new node representing each block whose buffer zone intersects with or touches the block, and (ii) an edge connecting the candidate node and the new node. In some embodiments, the geospatial data includes a geospatial parquet file that includes a polygonal boundary for each block of the plurality of blocks, and generating the undirected network graph comprises determining buffer zones that intersect with or touch the polygonal boundary of the block.

The method also includes selecting (608) an initial set of cohorts of blocks from the plurality of blocks. Each cohort in the initial set of cohorts corresponds to a respective connected component of the undirected network graph, and each cohort in the initial set of cohorts includes blocks in nodes of the respective connected component.

The method also includes ranking (610) each cohort in the initial set of cohorts based on a total number of premises in blocks within the respective cohort.

The method also includes selecting (612) where to deploy one or more communication networks based on the ranking.

In some embodiments, the method further includes obtaining a geospatial representation of a state road network, generating a new set of cohorts by iterating through the initial set of cohorts based on the geospatial representation, and selecting where to deploy the one or more communication networks further based on the new set of cohorts.

In some embodiments, generating the new set of cohorts is based on calculating a total road length and a ratio P of road footage to total premises count, for a current cohort.

In some embodiments, generating the new set of cohorts includes iterating through cohorts K other than the current cohort J, including: calculating a length of total road within K; calculating an approximate inter-cohort distance R between J and K; adding summed road distances of J and K to the approximate inter-cohort distance R to obtain R2; determining a ratio P2 of a sum of total homes within J and K to the cumulative road distance R2; in accordance with a determination that P2 is below P, merging the cohorts J and K to obtain a merged cohort for a subsequent step; and in accordance with a determination that P2 is not below P, forgoing merging the cohorts J and K, to use J for the subsequent step.

In some embodiments, the approximate inter-cohort distance road distance R between J and K is determined by calculating shortest distance between boundaries of J and K and multiplying that value by 1.4.

In some embodiments, the method further includes, in accordance with a determination that P2 is below P, adding K to an exclusion list to not be considered for addition to other cohorts.

In some embodiments, the method further includes ranking each cohort in the new set of cohorts according to a total number of premises in blocks corresponding to the respective cohort.

In some embodiments, the method further includes repeating generating another new set of cohorts by iterating through the new set of cohorts.

In some embodiments, the method further includes computing convex hull of cohorts and while iterating through cohorts K, in accordance with a determination that convex hull of the current cohort J includes convex hull of the cohort K, merging the two cohorts, ignoring adherence to ratio P.

In some embodiments, the method further includes prior to iterating through the cohorts K other than the current cohort J, clipping a road network data frame in the geospatial representation to those contained within a boundary of the current cohort J. With clipping, only roads within the outer boundary of the cohort may be utilized. The roads may be counted only once.

FIG. 7 shows a flowchart of another example method 700 for deployment of communication networks, according to some embodiments. The method is performed at a computing system (e.g., by the cohort modeling module 204 of the server 102) comprising a processor and memory.

The method includes obtaining (702) geospatial data (e.g., a geospatial parquet file) that includes polygonal boundary of a plurality of blocks within a geographical area.

In some embodiments, obtaining the plurality of blocks includes obtaining a collection of points having a common characteristic, clustering the points based on density and/or proximity to obtain the plurality of blocks. In some embodiments, each block is a polygon of a geographical area. a plurality of clusters, and/or building a polygonal surface for each cluster to obtain the plurality of blocks. In some embodiments, clustering the points generates a plurality of clusters, and obtaining the plurality of blocks includes building a polygonal surface for each cluster to obtain the plurality of blocks. A polygonal surface can include a mesh for 3-D, a convex hull, and/or a concave hull, which may be generated using linear algebra and/or geometry, for each cluster of points to obtain the plurality of blocks.

In some embodiments, the common characteristic is selected from a group consisting of: a region not served by fiber, demographics comprising household income, proximity to a road, geological composition of an area around a respective point, and a combination of the aforementioned.

In some embodiments, the method further includes, in accordance with a determination that the points are unavailable, forming polygonal shapes (e.g., rectangles, different shaped polygons) based on a plurality of census blocks, to obtain the plurality of blocks.

The method includes dynamically selecting and prioritizing (704) cohorts representing geographic areas for communication network construction using machine learning-based cohort modeling and multi-factor analysis of the geospatial data. Here, dynamic selection refers to selection based on updated information.

The method also includes identifying and optimizing (706) edge-out areas by constructing new cohorts based on proximity to existing builds and infrastructure (e.g., road, poles, conduits, utilities) in the geographic areas. Edge-out areas are areas that can be built that are extensions of an existing network. These areas can be attached or within close proximity so as to leverage existing infrastructure, including network, physical store fronts, support, etc. Edge-outs can be used to build onto an existing network, which is cheaper or faster, and/or more defensible. In some embodiments, identifying and optimizing the edge-out area includes scoring factors in addressable homes, density, and cost feasibility, including sequencing edge-out versus new regions to maximize network competitive positioning.

The method also includes selecting (708) where to deploy one or more communication networks based on the new cohorts.

In some embodiments, the method further includes maintaining a record of national and regional networks and infrastructure, including build costs and available grant funding, to determine optimal timing and ranking of full area builds remaining/available.

In some embodiments, the method further includes identifying optimal starting points for cohort construction considering data factors, competition presence, and/or fastest routes to complete regional interconnection, thereby enabling build sequencing to maximize build speed and efficiency.

In some embodiments, the method further includes continuously integrating new data sources into the geospatial data to refine and re-prioritize target geographic areas for communication network construction. For example, in-person confirmation of fiber presence, success of sales, and/or churn of customers, may be used for the continuous integration.

In some embodiments, obtaining geospatial data includes ingesting data from a plurality of disparate data sources including demographic statistics, competitor presence, and infrastructure maps. The data sources include structured and unstructured sources. Examples for structured sources include distance to nearest backhaul. Examples of unstructured sources include text descriptions of competitor offerings at an address from their websites.

In some embodiments, the method further includes, using machine learning-based cohort modeling includes inputting data from a plurality of disparate data sources to a machine learning algorithm that performs cohort modeling by adaptively connecting adjacent geographic areas into clusters that meet connectivity and construction thresholds.

In some embodiments, the method further includes using additional data layers to analyze and score each cohort, and selecting highest scoring cohorts for planning and construction. Example additional data layers include sales data, customer churn, and in-person investigation of fiber presence.

FIG. 8 shows a flowchart of another example method 800 for deployment of communication networks, according to some embodiments. The method is performed at a computing system (e.g., by the cohort modeling module 204 of the server 102) comprising a processor and memory.

The method includes ingesting and integrating (802) geospatial data from a plurality of structured and unstructured data sources.

The method also includes identifying (804) an initial geographic area and constructing a connected cohort using buffering and graph algorithms.

The method also includes analyzing (806; e.g., analyzing by the optional infrastructure classification module 214) infrastructure, competitive presence, demographics, and other attributes of the cohort to obtain one or more cohorts.

The method also includes scoring and ranking (808) the one or more cohorts based on one or more objective functions.

The method also includes merging (810) cohorts based on proximity and density thresholds.

The method also includes selecting (812) top ranking cohort regions for communication network construction and planning. In some embodiments, the method further includes re-scoring and re-ranking cohorts as new data is ingested.

In some embodiments, the method further includes updating analytical and predictive models (e.g., models of the optional modules described above in reference to FIG. 2B) for subsequent area selection based on feedback from on-ground assessments. Example models include models for predicting false positive probabilities or models for market segment assignment. Example on-ground assessment include confirmation that fiber infrastructure is present.

In some embodiments, the method further includes generating communication network construction plans and work packages, based on the cohort regions.

In some embodiments, the method further includes generating geographic and map visualizations based on the cohort regions.

In some embodiments, analyzing competitive presence of the cohort includes classification of blocks for the geospatial data to assign a probability of false positives in competitive presence, using trained random forest classifiers. In some embodiments, the trained random forest classifiers are trained using federal communications commission (FCC) broadband technology data, Internet speed test data, web scraper data, and in-person area assessment data. In some embodiments, the trained random forest classifiers include approximately 100 tree classifiers. In some embodiments, input data sources to these classifiers are aggregated at the block level before training.

In some embodiments, analyzing infrastructure of the cohort includes using image classification based on an implementation of the ResNet50 model that is trained on images of both positive and negative classes.

In some embodiments, analyzing infrastructure of the cohort includes using a pretrained vision-and-language transformer to assess satellite, aerial, and/or street view images for predetermined locations. The vision-and-language-transformer uses a set of predetermined prompting questions to understand a presence of technologies in images, as opposed to discrete class assignments.

Figure 9A:
FIG. 9A shows a map of an example geographic area, according to some embodiments.
Figure 9B:
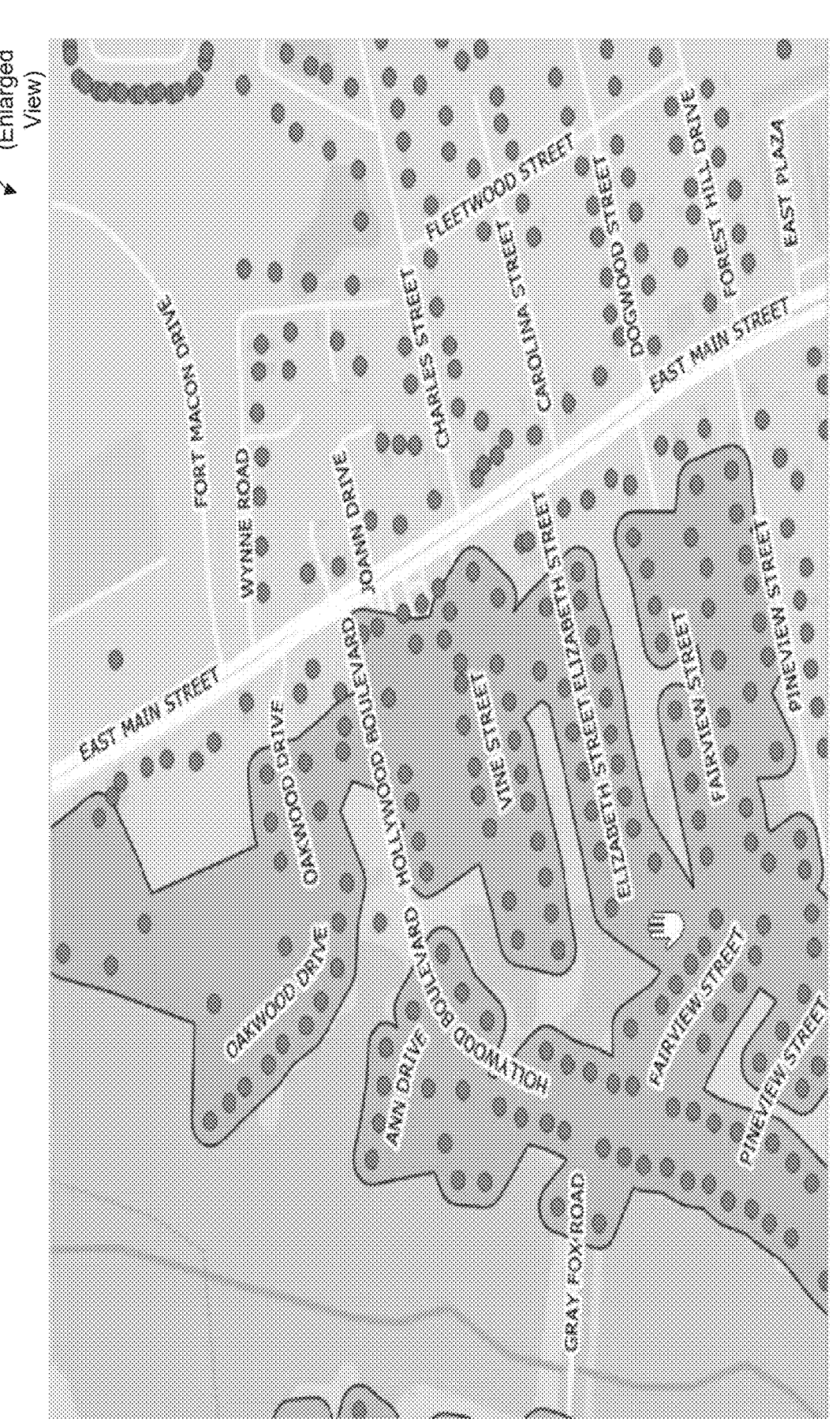
FIG. 9B shows an enlarged view of the geographic area shown in FIG. 9A, according to some embodiments.
Figure 10:
FIG. 10 shows an example view of a geographic area with blocks, according to some embodiments.

FIG. 9A shows a map of an example geographic area 900, according to some embodiments. The map shows dots or points 902 that correspond to address locations that share a common characteristics (e.g., locations that do not have a communication network). FIG. 9B shows an enlarged view of the geographic area 900. Using clustering, some embodiments generate a boundary that wraps around a set of points to create a new geometry. The new geometry may overlap with one or more census blocks. The new geometry is informed by census blocks. FIG. 10 shows an example view 1000 of a geographic area that shows example polygonal shapes 1002, 1004, 1006, each of which may be formed based on points, such as the ones shown in FIG. 9A.

As described above in reference to FIGS. 7 and 8, in some embodiments, obtaining the plurality of blocks includes obtaining a collection of points (e.g., the points 902) having a common characteristic, clustering the points based on density and/or proximity to obtain the plurality of blocks. In some embodiments, each block is a polygon of a geographical area. a plurality of clusters, and/or building a polygonal surface (e.g., the polygons 1002, 1004 and 1006) for each cluster to obtain the plurality of blocks. In some embodiments, clustering the points generates a plurality of clusters, and obtaining the plurality of blocks includes building a polygonal surface for each cluster to obtain the plurality of blocks. A polygonal surface can include a mesh for 3-D, a convex hull, and/or a concave hull, which may be generated using linear algebra and/or geometry, for each cluster of points to obtain the plurality of blocks. In some embodiments, the common characteristic is selected from a group consisting of: a region not served by fiber, demographics comprising household income, proximity to a road, geological composition of an area around a respective point, and a combination of the aforementioned.

Figure 11:
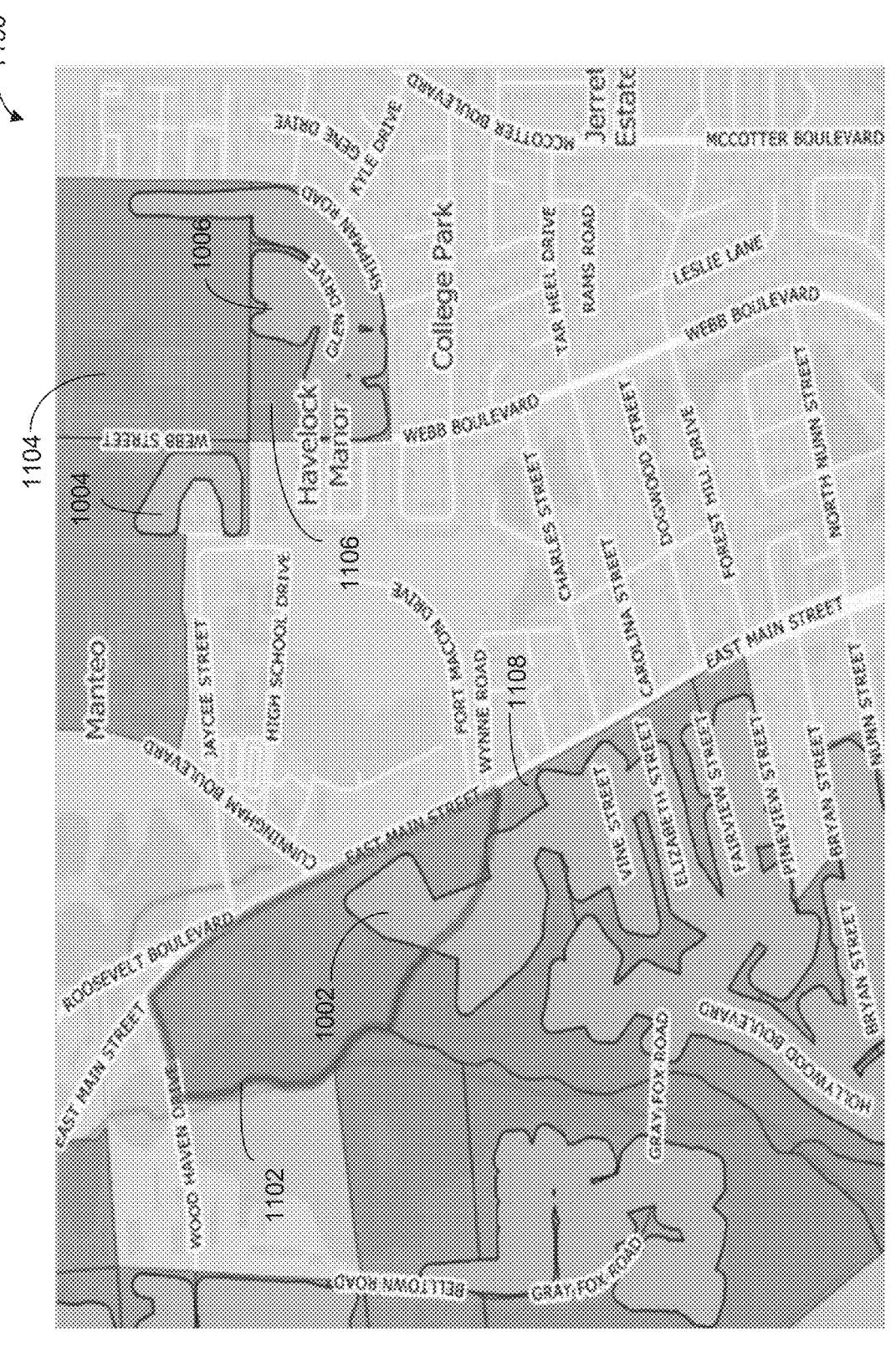
FIG. 11 illustrates the relationship between census blocks and blocks, according to some embodiments.

FIG. 11 illustrates the relationship between census blocks and blocks, according to some embodiments. A map of an example geographic area 1100 is shown. Boundary of a census block 1102 is highlighted. As shown by the census block 1102 and census block 1108, more than one census block may overlap with a block (e.g., the block 1002). A block may correspond to, or include points from, a plurality of census blocks. For example, the census block 1006 includes points from the census block 1104 and 1006. Census blocks may provide points or locations, which may be filtered, to form the initial dots for forming the blocks. In some embodiments, in accordance with a determination that the points are unavailable, blocks may be formed by generating polygonal shapes (e.g., rectangles, different shaped polygons) based on census blocks.

FIGS. 12A and 12B show example census information 1200 for a geographic area, according to some embodiments. In some embodiments, the census blocks are used as blocks directly. In some embodiments, census block boundaries are used to select points based on information in a census block, such as total household income, home value, and fiber presence, whereby all points that intersect with the census block polygon are used due to their favorable values, whereafter the new blocks are generated from the boundaries drawn around these points. In some embodiments, subdivisions of census blocks are combined to form new blocks.

While embodiments and alternatives have been disclosed and discussed, the invention herein is not limited to the particular disclosed embodiments or alternatives but encompasses the full breadth and scope of the invention including equivalents, and the invention is not limited except as set forth in and encompassed by the full breadth and scope of the claims herein.

What is claimed is:

1. A method for deploying a communication network, the method comprising:
  at a computing system comprising a processor and memory:
    obtaining geospatial data corresponding to a plurality of blocks within a geographical area;
    for each cohort of a plurality of cohorts:
      selecting as the respective cohort a block of the plurality of blocks;
      adding a buffer zone of a predetermined size around the respective cohort;
      appending, to the respective cohort, blocks of the plurality of blocks that touch the respective cohort or intersect with the buffer zone; and
      repeating the adding and appending until there are no further blocks to add to the respective cohort;
    ranking the plurality of cohorts based on a total number of premises within each respective cohort; and
    selecting where to deploy one or more communication networks based on the ranking.

2. The method of claim 1, wherein obtaining the plurality of blocks comprises:
  obtaining a collection of points having a common characteristic; and
  clustering the points based on density and/or proximity to obtain the plurality of blocks.

3. The method of claim 2, wherein each block is a polygon of a geographical area.

4. The method of claim 2, wherein clustering the points generates a plurality of clusters, wherein obtaining the plurality of blocks comprises building a polygonal surface for each cluster to obtain the plurality of blocks.

5. The method of claim 2, wherein the common characteristic is selected from a group consisting of: a region not served by fiber, demographics comprising household income, proximity to a road, geological composition of an area around a respective point, and a combination of the aforementioned.

6. The method of claim 2, further comprising:
  in accordance with a determination that the points are unavailable, forming polygonal shapes based on a plurality of census blocks, to obtain the plurality of blocks.

7. The method of claim 1, further comprising:
  prior to the ranking, combining into a single cohort nearby cohorts that meet predetermined proximity criteria.

8. The method of claim 7, wherein the predetermined proximity criteria comprises ratio of road footage to total premises count for a combined cohort being below a predetermined ratio.

9. The method of claim 7, wherein the predetermined proximity criteria is based on a distance between cohorts.

10. The method of claim 1, further comprising:
  after the obtaining and prior to the selecting, filtering blocks to only include those blocks that meet certain filtering criteria.

11. The method of claim 10, wherein the filtering criteria comprises (i) a respective block having a premises density above a predetermined threshold, (ii) the respective block having at least a predetermined number of premises, (iii) there being no broadband internet access in the respective block, (iv) there being fewer than a predetermined number or percentage of premises within the respective block with broadband access, or (v) a ratio of a total length of road in the respective block to number of premises in the respective block being less than a predetermined number.

12. The method of claim 1, further comprising:
deploying the one or more communication networks in geographic areas based on the ranking of the plurality of cohorts.

13. The method of claim 1, further comprising:
deploying a communication network in the geographic area that corresponds to the highest ranked cohort of the plurality of cohorts.

14. The method of claim 1, further comprising:
prior to the ranking, combining into a single cohort any cohorts that touch one another or have an intersecting buffer zone.

15. The method of claim 1, wherein the predetermined size of the buffer zone is approximately 30 to 100 meters.

16. The method of claim 1, wherein the predetermined size of the buffer zone is approximately 40 to 60 meters.

17. The method of claim 1, further comprising:
training a machine learning model using successful deployments of communication networks in blocks over time; and
either (i) applying the machine learning model to new blocks in a geographic region to filter out unsuitable blocks from suitable blocks, or (ii) applying the machine learning model to rank the plurality of cohorts.

18. The method of claim 1, further comprising:
ranking the plurality of cohorts further based on build costs and available grant funding obtained from one or more records of national and regional networks and infrastructure.

19. The method of claim 1, further comprising: identifying optimal starting points for cohort construction considering data factors, competition presence, and/or fastest routes to complete regional interconnection, thereby enabling build sequencing to maximize build speed and efficiency.

20. The method of claim 1, further comprising:
generating geographic and map visualizations based on regions of the cohort.

21. The method of claim 1, wherein the geospatial data includes associated data for each block including density of premises and broadband internet connections, the method further comprising:
applying a set of filters to the geospatial data to select one or more blocks from the plurality of blocks, each block of the one or more blocks (i) having premises density above a predetermined threshold and (ii) having either no broadband internet connection using optical fiber or connection counts for a particular type of broadband internet connection that is less than a predetermined number of units in the block.

22. The method of claim 21, wherein applying the set of filters to the geospatial data comprises selecting blocks that either have no broadband internet connection using optical fiber or have connection counts for a particular type of broadband internet connection that is less than a predetermined number of units in the block.

23. The method of claim 1, further comprising:
obtaining a geospatial representation of a state road network;
generating a new set of cohorts by iterating through the plurality of cohorts based on the geospatial representation; and
selecting where to deploy the one or more communication networks further based on the new set of cohorts.

24. A computer system for deploying a communication network, comprising:
one or more processors; and
memory;
wherein the memory stores one or more programs configured for execution by the one or more processors, and the one or more programs comprising instructions for:
obtaining geospatial data corresponding to a plurality of blocks within a geographical area;
for each cohort of a plurality of cohorts:
selecting as the respective cohort a block of the plurality of blocks;
adding a buffer zone of a predetermined size around the respective cohort;
appending, to the respective cohort, blocks of the plurality of blocks that touch the respective cohort or intersect with the buffer zone; and
repeating the adding and appending until there are no further blocks to add to the respective cohort;
ranking the plurality of cohorts based on a total number of premises within each respective cohort; and
selecting where to deploy one or more communication networks based on the ranking.

25. A non-transitory computer readable storage medium storing one or more programs configured for execution by a computer system having one or more processors, the one or more programs comprising instructions for:
obtaining geospatial data corresponding to a plurality of blocks within a geographical area;
for each cohort of a plurality of cohorts:
selecting as the respective cohort a block of the plurality of blocks;
adding a buffer zone of a predetermined size around the respective cohort;
appending, to the respective cohort, blocks of the plurality of blocks that touch the respective cohort or intersect with the buffer zone; and
repeating the adding and appending until there are no further blocks to add to the respective cohort;
ranking the plurality of cohorts based on a total number of premises within each respective cohort; and
selecting where to deploy one or more communication networks based on the ranking.

* * * * *